US008738451B2

(12) United States Patent
Ahlers et al.

(10) Patent No.: US 8,738,451 B2
(45) Date of Patent: May 27, 2014

(54) SYSTEM, PROGRAM PRODUCT, AND METHOD FOR DEBIT CARD AND CHECKING ACCOUNT AUTODRAW

(75) Inventors: Rebecca Ahlers, Cincinnati, OH (US); Andrew B. Crowe, Omaha, NE (US); Scott H. Galit, New York, NY (US); Trent Sorbe, Brookings, SD (US)

(73) Assignee: Metabank, Sioux Falls, SD (US)

( * ) Notice: Subject to any disclaimer, the term of this patent is extended or adjusted under 35 U.S.C. 154(b) by 4 days.

(21) Appl. No.: 12/417,162

(22) Filed: Apr. 2, 2009

(65) Prior Publication Data

US 2009/0254441 A1  Oct. 8, 2009

Related U.S. Application Data

(60) Provisional application No. 61/042,612, filed on Apr. 4, 2008, provisional application No. 61/042,624, filed on Apr. 4, 2008, provisional application No. 61/082,863, filed on Jul. 23, 2008, provisional application No. 61/052,454, filed on May 12, 2008, provisional application No. 61/060,559, filed on Jun. 11, 2008, provisional application No. 61/053,056, filed on May 14, 2008.

(51) Int. Cl.
*G06Q 20/00* (2012.01)
*G06Q 40/00* (2012.01)

(52) U.S. Cl.
USPC .................................. 705/17; 705/37; 705/35

(58) Field of Classification Search
None
See application file for complete search history.

(56) References Cited

U.S. PATENT DOCUMENTS

| 3,752,904 A | 8/1973 | Waterbury |
| 4,247,759 A | 1/1981 | Yuris et al. |
| 4,334,307 A | 6/1982 | Bourgeois et al. |
| 4,439,636 A | 3/1984 | Newkirk et al. |
| 4,449,040 A | 5/1984 | Matsuoka et al. |

(Continued)

FOREIGN PATENT DOCUMENTS

| EP | 0397512 A2 | 11/1990 |
| EP | 0619565 A1 | 10/1994 |

(Continued)

OTHER PUBLICATIONS

Congressional Budget Office, "Emerging Electronic Methods for Making Payments" (Jun. 1996), CBO.

(Continued)

*Primary Examiner* — Ryan Zeender
*Assistant Examiner* — Denisse Ortiz Roman
(74) *Attorney, Agent, or Firm* — Bracewell & Giuliani LLP

(57) ABSTRACT

A consumer is prequalified for a line of credit attached to a checking account by a lending institution computer responsive to consumer underwriting data. The lending institution computer makes available draws to the line of credit line in an authorization stream for a proposed payment from the checking account. When the line of credit is accessed, the checking account is credited with an additional value equal to one or more preselected loan increments so that the account then has a new amount totaling a previous amount plus the amount of value of the one or more preselected loan increments and so that the new amount exceeds or equals the value of a proposed payment. Next a new value for the line of credit balance available is determined, accounting for value credited to the checking account and a preselected loan advance fee for each loan increment credited to the account.

20 Claims, 15 Drawing Sheets

(56) References Cited

U.S. PATENT DOCUMENTS

| | | |
|---|---|---|
| 4,528,643 A | 7/1985 | Freeny, Jr. |
| 4,532,416 A | 7/1985 | Berstein |
| 4,577,061 A | 3/1986 | Katzaff et al. |
| 4,625,276 A | 11/1986 | Benton et al. |
| 4,677,565 A | 6/1987 | Ogaki et al. |
| 4,678,895 A | 7/1987 | Tateisi et al. |
| 4,706,275 A | 11/1987 | Kamal |
| 4,722,054 A | 1/1988 | Yorozu et al. |
| 4,727,243 A | 2/1988 | Saver |
| 4,750,201 A | 6/1988 | Hodgson et al. |
| 4,797,540 A | 1/1989 | Kimizu |
| 4,827,113 A | 5/1989 | Rikuna |
| 4,868,900 A | 9/1989 | McGuire |
| 4,877,947 A | 10/1989 | Mori |
| 4,879,744 A | 11/1989 | Tasaki et al. |
| 4,884,212 A | 11/1989 | Stutsman |
| 4,951,308 A | 8/1990 | Bishop et al. |
| 4,968,873 A | 11/1990 | Dethloff et al. |
| 5,012,077 A | 4/1991 | Takano |
| 5,048,085 A | 9/1991 | Abraham et al. |
| 5,050,207 A | 9/1991 | Hitchcock |
| 5,068,891 A | 11/1991 | Marshall |
| 5,101,098 A | 3/1992 | Naito |
| 5,138,650 A | 8/1992 | Stahl et al. |
| 5,146,067 A | 9/1992 | Sloan et al. |
| 5,148,481 A | 9/1992 | Abraham et al. |
| 5,155,342 A | 10/1992 | Urano |
| 5,163,086 A | 11/1992 | Ahearn et al. |
| 5,192,947 A | 3/1993 | Neustein |
| 5,220,593 A | 6/1993 | Zicker et al. |
| 5,221,838 A | 6/1993 | Gutman et al. |
| 5,225,666 A | 7/1993 | Amarena et al. |
| 5,264,689 A | 11/1993 | Maes et al. |
| 5,265,155 A | 11/1993 | Castro |
| 5,266,782 A | 11/1993 | Alanärä et al. |
| 5,272,320 A | 12/1993 | Hakamada |
| 5,278,752 A | 1/1994 | Narita et al. |
| 5,285,382 A | 2/1994 | Muehlberger et al. |
| 5,327,482 A | 7/1994 | Yamamoto |
| 5,334,821 A | 8/1994 | Campo et al. |
| 5,340,969 A | 8/1994 | Cox |
| 5,352,876 A | 10/1994 | Watanabe et al. |
| 5,359,182 A | 10/1994 | Schilling |
| 5,409,092 A | 4/1995 | Itako et al. |
| 5,416,306 A | 5/1995 | Imahata |
| 5,438,186 A | 8/1995 | Nair et al. |
| 5,442,567 A | 8/1995 | Small |
| 5,448,044 A | 9/1995 | Price et al. |
| 5,465,206 A | 11/1995 | Hilt et al. |
| 5,477,038 A | 12/1995 | Levine et al. |
| 5,504,808 A | 4/1996 | Hamrick, Jr. |
| 5,511,114 A | 4/1996 | Stimson et al. |
| 5,513,117 A | 4/1996 | Small |
| 5,550,358 A | 8/1996 | Tait et al. |
| 5,577,109 A | 11/1996 | Stimson et al. |
| 5,577,121 A | 11/1996 | Davis et al. |
| 5,661,254 A | 8/1997 | Steuer et al. |
| 5,696,908 A | 12/1997 | Muehlberger et al. |
| 5,699,528 A | 12/1997 | Hogan |
| 5,732,136 A | 3/1998 | Murphree et al. |
| 5,814,798 A | 9/1998 | Zancho |
| 5,841,365 A | 11/1998 | Rimkus |
| 5,859,419 A | 1/1999 | Wynn |
| 5,870,721 A | 2/1999 | Norris |
| 5,875,437 A | 2/1999 | Atkins |
| 5,878,141 A | 3/1999 | Daly et al. |
| 5,893,907 A | 4/1999 | Ukuda |
| 5,897,620 A | 4/1999 | Walker et al. |
| 5,920,848 A | 7/1999 | Schutzer et al. |
| 5,923,016 A | 7/1999 | Fredregill et al. |
| 5,933,812 A | 8/1999 | Meyer et al. |
| 5,963,921 A | 10/1999 | Longfield |
| 6,000,608 A | 12/1999 | Dorf |
| 6,012,635 A | 1/2000 | Shimada et al. |
| 6,021,397 A | 2/2000 | Jones et al. |
| 6,032,859 A | 3/2000 | Muehlberger et al. |
| 6,041,308 A | 3/2000 | Walker et al. |
| 6,065,679 A | 5/2000 | Levie et al. |
| 6,112,191 A | 8/2000 | Burke |
| 6,144,948 A | 11/2000 | Walker et al. |
| 6,154,738 A | 11/2000 | Call |
| 6,189,787 B1 | 2/2001 | Dorf |
| 6,208,978 B1 | 3/2001 | Walker et al. |
| 6,249,773 B1 | 6/2001 | Allard et al. |
| 6,253,998 B1 | 7/2001 | Ziamo |
| 6,304,860 B1 | 10/2001 | Martin et al. |
| 6,315,193 B1 | 11/2001 | Hogan |
| 6,450,407 B1 | 9/2002 | Freeman et al. |
| 6,467,684 B2 | 10/2002 | Fite et al. |
| 6,704,714 B1 | 3/2004 | O'Leary et al. |
| 6,739,506 B1 | 5/2004 | Constantine |
| 6,865,544 B1 | 3/2005 | Austin |
| 6,920,434 B1 | 7/2005 | Cossette |
| 6,999,943 B1 | 2/2006 | Johnson et al. |
| 7,010,507 B1 | 3/2006 | Anderson et al. |
| 7,031,939 B1 | 4/2006 | Gallagher et al. |
| 7,072,862 B1 | 7/2006 | Wilson |
| 7,127,452 B1 | 10/2006 | Yashiro |
| 7,177,829 B1 | 2/2007 | Wilson |
| 7,206,761 B2 | 4/2007 | Colvin |
| 7,252,223 B2 | 8/2007 | Schofield |
| 7,258,273 B2 | 8/2007 | Griffin |
| 7,370,076 B2 | 5/2008 | Friedman et al. |
| 7,392,224 B1 | 6/2008 | Bauer et al. |
| 7,398,919 B2 | 7/2008 | Cooper |
| 7,426,492 B1 | 9/2008 | Bishop et al. |
| 7,451,920 B1 | 11/2008 | Rose |
| 7,472,089 B2 | 12/2008 | Hu et al. |
| 7,493,279 B1 | 2/2009 | Kwan |
| 7,509,286 B1 | 3/2009 | Bent et al. |
| 7,546,945 B1 | 6/2009 | Bucci et al. |
| 7,567,936 B1 | 7/2009 | Peckover et al. |
| 7,599,879 B2 | 10/2009 | Louie et al. |
| 7,606,918 B2 | 10/2009 | Holzman et al. |
| 7,607,570 B1 | 10/2009 | Constantine |
| 7,628,319 B2 | 12/2009 | Brown et al. |
| 7,653,591 B1 | 1/2010 | Dabney |
| 7,702,583 B1 | 4/2010 | Hamilton et al. |
| 7,702,587 B2 | 4/2010 | Nguyen et al. |
| 7,752,102 B2 | 7/2010 | Thomas |
| 7,757,944 B2 | 7/2010 | Cline et al. |
| 7,783,571 B2 | 8/2010 | Fish et al. |
| 7,792,717 B1 | 9/2010 | Hankins et al. |
| 7,810,735 B2 | 10/2010 | Madani |
| 7,813,955 B2 | 10/2010 | Ariff et al. |
| 7,814,012 B2 | 10/2010 | Johnson |
| 7,856,399 B2 | 12/2010 | Wilkes |
| 7,865,434 B2 | 1/2011 | Sheets |
| 7,873,569 B1 | 1/2011 | Cahn |
| 7,899,750 B1 | 3/2011 | Klieman et al. |
| 7,904,333 B1 | 3/2011 | Perkowski |
| 7,933,833 B1 | 4/2011 | Hotz et al. |
| 7,954,704 B1 | 6/2011 | Gephart et al. |
| 8,024,242 B2 | 9/2011 | Galit |
| 8,046,256 B2 | 10/2011 | Chien et al. |
| 8,051,006 B1 | 11/2011 | Rourk |
| 8,055,557 B2 | 11/2011 | Sorbe et al. |
| 8,065,187 B2 | 11/2011 | Ahlers et al. |
| 8,069,085 B2 | 11/2011 | Ahlers et al. |
| 8,086,494 B2 | 12/2011 | Dooley et al. |
| 8,090,649 B2 | 1/2012 | Galit et al. |
| 8,103,549 B1 | 1/2012 | Ahlers et al. |
| 8,108,272 B2 | 1/2012 | Sorbe et al. |
| 8,108,279 B2 | 1/2012 | Galit et al. |
| 8,108,977 B1 | 2/2012 | Miller |
| 8,150,764 B2 | 4/2012 | Crowe et al. |
| 8,175,962 B2 | 5/2012 | Galit et al. |
| 8,175,972 B2 | 5/2012 | Galit et al. |
| 8,190,480 B1 | 5/2012 | Ahlers et al. |
| 8,214,286 B1 | 7/2012 | Galit et al. |
| 8,244,611 B2 | 8/2012 | Galit |
| 8,244,637 B2 | 8/2012 | Galit et al. |
| 8,260,678 B2 | 9/2012 | Miller |
| 8,266,047 B2 | 9/2012 | Galit |

(56) References Cited

U.S. PATENT DOCUMENTS

| | | |
|---|---|---|
| 8,286,863 B1 | 10/2012 | Brooks |
| 8,290,853 B2 | 10/2012 | Galit |
| 8,296,227 B2 | 10/2012 | Galit et al. |
| 8,301,557 B1 | 10/2012 | Crowe et al. |
| 8,306,912 B2 | 11/2012 | Galit |
| 8,341,021 B2 | 12/2012 | Ahlers et al. |
| 8,355,984 B1 | 1/2013 | Galit et al. |
| 8,371,502 B1 | 2/2013 | Galit et al. |
| 8,386,375 B2 | 2/2013 | Galit |
| 8,392,299 B2 | 3/2013 | Sorbe et al. |
| 8,392,330 B2 | 3/2013 | Sorbe et al. |
| 8,403,211 B2 | 3/2013 | Brooks et al. |
| 8,485,441 B2 | 7/2013 | Brooks |
| 8,494,960 B2 | 7/2013 | Galit et al. |
| 8,538,879 B2 | 9/2013 | Galit et al. |
| 8,589,295 B2 | 11/2013 | Sorbe et al. |
| 2001/0021925 A1 | 9/2001 | Ukigawa et al. |
| 2001/0034663 A1 | 10/2001 | Teveler et al. |
| 2001/0034676 A1 | 10/2001 | Vasic |
| 2001/0042785 A1 | 11/2001 | Walker et al. |
| 2002/0002075 A1 | 1/2002 | Rowe |
| 2002/0032612 A1 | 3/2002 | Williams et al. |
| 2002/0038285 A1 | 3/2002 | Golden et al. |
| 2002/0042744 A1 | 4/2002 | Kohl |
| 2002/0055904 A1 | 5/2002 | Mon |
| 2002/0055909 A1 | 5/2002 | Fung et al. |
| 2002/0077971 A1 | 6/2002 | Allred |
| 2002/0107797 A1 | 8/2002 | Combaluzier |
| 2002/0111886 A1 | 8/2002 | Chenevich et al. |
| 2002/0138415 A1 | 9/2002 | Siska |
| 2002/0152161 A1 | 10/2002 | Aoike |
| 2002/0194122 A1 | 12/2002 | Knox et al. |
| 2002/0194124 A1 | 12/2002 | Hobbs et al. |
| 2003/0001005 A1 | 1/2003 | Risafi et al. |
| 2003/0004997 A1 | 1/2003 | Parker et al. |
| 2003/0055782 A1 | 3/2003 | Slater |
| 2003/0061170 A1 | 3/2003 | Uzo |
| 2003/0074311 A1 | 4/2003 | Saylors et al. |
| 2003/0097331 A1 | 5/2003 | Cohen |
| 2003/0135459 A1 | 7/2003 | Abelman et al. |
| 2003/0144935 A1 | 7/2003 | Sobek |
| 2003/0158811 A1 | 8/2003 | Sanders et al. |
| 2003/0167225 A1 | 9/2003 | Adams |
| 2003/0191702 A1 | 10/2003 | Hurley |
| 2003/0191714 A1 | 10/2003 | Norris |
| 2003/0197059 A1 | 10/2003 | Tidball et al. |
| 2003/0200118 A1 | 10/2003 | Lee et al. |
| 2003/0208443 A1 | 11/2003 | Mersky |
| 2003/0217003 A1 | 11/2003 | Weinflash et al. |
| 2004/0036215 A1 | 2/2004 | Butler, II |
| 2004/0047459 A1 | 3/2004 | Diaz |
| 2004/0098351 A1 | 5/2004 | Duke |
| 2004/0111370 A1 | 6/2004 | Saylors et al. |
| 2004/0117250 A1 | 6/2004 | Lubow et al. |
| 2004/0117302 A1 | 6/2004 | Weichert et al. |
| 2004/0133515 A1 | 7/2004 | McCoy et al. |
| 2004/0143527 A1 | 7/2004 | Benkert et al. |
| 2004/0148252 A1 | 7/2004 | Fleishman |
| 2004/0153407 A1 | 8/2004 | Clubb et al. |
| 2004/0199463 A1 | 10/2004 | Deggendorf |
| 2004/0210484 A1 | 10/2004 | Lee |
| 2004/0211830 A1 | 10/2004 | Algiene |
| 2004/0215554 A1 | 10/2004 | Kemper et al. |
| 2004/0225545 A1 | 11/2004 | Turner et al. |
| 2004/0230523 A1 | 11/2004 | Johnson |
| 2004/0235542 A1 | 11/2004 | Stronach et al. |
| 2004/0236646 A1 | 11/2004 | Wu et al. |
| 2005/0004839 A1 | 1/2005 | Bakker et al. |
| 2005/0015332 A1 | 1/2005 | Chen |
| 2005/0021363 A1 | 1/2005 | Stimson et al. |
| 2005/0071230 A1 | 3/2005 | Mankoff |
| 2005/0075939 A1 | 4/2005 | Bao et al. |
| 2005/0082364 A1 | 4/2005 | Alvarez et al. |
| 2005/0108121 A1 | 5/2005 | Gravett et al. |
| 2005/0167481 A1 | 8/2005 | Hansen et al. |
| 2005/0167487 A1 | 8/2005 | Conlon et al. |
| 2005/0173520 A1 | 8/2005 | Jaros et al. |
| 2005/0177489 A1 | 8/2005 | Neff et al. |
| 2005/0177502 A1 | 8/2005 | Thomas |
| 2005/0203837 A1 | 9/2005 | Leigh et al. |
| 2005/0205663 A1 | 9/2005 | Algiene |
| 2005/0228724 A1 | 10/2005 | Frangiosa |
| 2005/0278188 A1 | 12/2005 | Thomson et al. |
| 2005/0278347 A1 | 12/2005 | Wolf et al. |
| 2005/0283436 A1 | 12/2005 | Greer et al. |
| 2005/0289044 A1 | 12/2005 | Breslin et al. |
| 2006/0059085 A1* | 3/2006 | Tucker .......................... 705/38 |
| 2006/0085269 A1 | 4/2006 | Guilfoyle |
| 2006/0085334 A1 | 4/2006 | Murphy |
| 2006/0149665 A1 | 7/2006 | Weksler |
| 2006/0149670 A1 | 7/2006 | Nguyen et al. |
| 2006/0161499 A1 | 7/2006 | Rich et al. |
| 2006/0169784 A1 | 8/2006 | Collins et al. |
| 2006/0190322 A1 | 8/2006 | Oehlerking et al. |
| 2006/0206402 A1 | 9/2006 | Sullivan |
| 2006/0212392 A1 | 9/2006 | Brown |
| 2006/0212393 A1 | 9/2006 | Brown |
| 2006/0224502 A1 | 10/2006 | McGowan |
| 2006/0249570 A1 | 11/2006 | Seifert et al. |
| 2006/0249870 A1 | 11/2006 | Tachauer |
| 2006/0259364 A1 | 11/2006 | Strock et al. |
| 2006/0259957 A1 | 11/2006 | Tam et al. |
| 2006/0282356 A1 | 12/2006 | Andres et al. |
| 2006/0282374 A1 | 12/2006 | Stone |
| 2006/0293966 A1 | 12/2006 | Inouye |
| 2007/0000997 A1 | 1/2007 | Lambert et al. |
| 2007/0011089 A1 | 1/2007 | DeSchryver |
| 2007/0038515 A1 | 2/2007 | Postrel |
| 2007/0038924 A1 | 2/2007 | Beyer et al. |
| 2007/0045401 A1 | 3/2007 | Sturm |
| 2007/0061206 A1 | 3/2007 | LeFebvre |
| 2007/0083462 A1 | 4/2007 | Cubillo et al. |
| 2007/0087819 A1 | 4/2007 | Van Luchene et al. |
| 2007/0090183 A1 | 4/2007 | Hursta et al. |
| 2007/0100745 A1 | 5/2007 | Keiser |
| 2007/0100746 A1 | 5/2007 | Blair et al. |
| 2007/0100748 A1 | 5/2007 | Dheer et al. |
| 2007/0106603 A1 | 5/2007 | Whyte et al. |
| 2007/0136194 A1 | 6/2007 | Sloan |
| 2007/0152038 A1 | 7/2007 | Ciancio et al. |
| 2007/0168265 A1 | 7/2007 | Rosenberger |
| 2007/0174189 A1 | 7/2007 | Bishop et al. |
| 2007/0175982 A1 | 8/2007 | Bonalle et al. |
| 2007/0175984 A1 | 8/2007 | Khandaker et al. |
| 2007/0198352 A1 | 8/2007 | Kannegiesser |
| 2007/0198354 A1 | 8/2007 | Senghore et al. |
| 2007/0198403 A1 | 8/2007 | Aloni et al. |
| 2007/0233596 A1 | 10/2007 | Ambrose |
| 2007/0244778 A1 | 10/2007 | Bailard |
| 2007/0250380 A1 | 10/2007 | Mankoff |
| 2007/0260536 A1 | 11/2007 | Stone |
| 2007/0262140 A1 | 11/2007 | Long, Sr. |
| 2007/0265957 A1 | 11/2007 | Advani et al. |
| 2007/0265960 A1 | 11/2007 | Advani et al. |
| 2007/0267479 A1 | 11/2007 | Nix et al. |
| 2007/0271178 A1 | 11/2007 | Davis et al. |
| 2007/0276736 A1 | 11/2007 | Guilfoyle |
| 2007/0282740 A1 | 12/2007 | Wendt |
| 2008/0005001 A1 | 1/2008 | Davis et al. |
| 2008/0021772 A1 | 1/2008 | Aloni et al. |
| 2008/0040261 A1 | 2/2008 | Nix et al. |
| 2008/0040265 A1 | 2/2008 | Rackley, III et al. |
| 2008/0052189 A1 | 2/2008 | Walker et al. |
| 2008/0052224 A1 | 2/2008 | Parker |
| 2008/0059363 A1 | 3/2008 | Hotz et al. |
| 2008/0065532 A1 | 3/2008 | De la Motte |
| 2008/0091519 A1 | 4/2008 | Foss |
| 2008/0103968 A1 | 5/2008 | Bies et al. |
| 2008/0103970 A1 | 5/2008 | Books et al. |
| 2008/0120129 A1 | 5/2008 | Seubert et al. |
| 2008/0140561 A1 | 6/2008 | Neel |
| 2008/0140568 A1 | 6/2008 | Henry |
| 2008/0162271 A1 | 7/2008 | Benjamin |
| 2008/0162337 A1 | 7/2008 | Greenland et al. |

(56) References Cited

U.S. PATENT DOCUMENTS

| | | | |
|---|---|---|---|
| 2008/0210753 A1 | 9/2008 | Plozay et al. | |
| 2008/0228643 A1 | 9/2008 | Hall | |
| 2008/0235095 A1 | 9/2008 | Oles et al. | |
| 2008/0270298 A1 | 10/2008 | McElroy et al. | |
| 2008/0281734 A1 | 11/2008 | Longe et al. | |
| 2008/0294977 A1 | 11/2008 | Friedman et al. | |
| 2008/0301162 A1 | 12/2008 | Wall et al. | |
| 2009/0006203 A1 | 1/2009 | Fordyce, III et al. | |
| 2009/0048963 A1 | 2/2009 | Bishop et al. | |
| 2009/0061929 A1 | 3/2009 | Evans | |
| 2009/0063297 A1 | 3/2009 | Dooley et al. | |
| 2009/0063342 A1 | 3/2009 | Beckers | |
| 2009/0063351 A1 | 3/2009 | Schmeyer et al. | |
| 2009/0078757 A1 | 3/2009 | Hanson et al. | |
| 2009/0157220 A1 | 6/2009 | Walker et al. | |
| 2009/0164351 A1 | 6/2009 | Sorbe et al. | |
| 2009/0164362 A1 | 6/2009 | Moore | |
| 2009/0164363 A1* | 6/2009 | Ahlers et al. | 705/38 |
| 2009/0171775 A1 | 7/2009 | Cashion et al. | |
| 2009/0192934 A1 | 7/2009 | Chu et al. | |
| 2009/0222367 A1 | 9/2009 | Jenkins et al. | |
| 2009/0228307 A1 | 9/2009 | Sorbe | |
| 2009/0254431 A1 | 10/2009 | Crowe et al. | |
| 2010/0030687 A1 | 2/2010 | Panthaki et al. | |
| 2010/0057554 A1 | 3/2010 | Lanford | |
| 2010/0057609 A1 | 3/2010 | Sibson | |
| 2010/0076836 A1 | 3/2010 | Giordano et al. | |
| 2010/0076875 A1 | 3/2010 | Ernst et al. | |
| 2010/0106555 A1 | 4/2010 | Mneimneh et al. | |
| 2010/0222132 A1 | 9/2010 | Sanford et al. | |
| 2010/0280949 A1 | 11/2010 | Van Rensburg | |
| 2010/0306104 A1 | 12/2010 | Johnson | |
| 2010/0312684 A1* | 12/2010 | Kemper et al. | 705/37 |
| 2011/0047039 A1 | 2/2011 | Crames et al. | |
| 2011/0093323 A1 | 4/2011 | Prus et al. | |
| 2011/0106698 A1 | 5/2011 | Isaacson et al. | |
| 2011/0112957 A1 | 5/2011 | Ingram et al. | |
| 2011/0270664 A1 | 11/2011 | Jones | |
| 2013/0124429 A1 | 5/2013 | Zou et al. | |

FOREIGN PATENT DOCUMENTS

| | | |
|---|---|---|
| EP | 0348932 A2 | 5/1995 |
| JP | 2-238593 A | 9/1990 |
| JP | 2-278495 A | 11/1990 |
| JP | 3-100791 A | 4/1991 |
| JP | 4-165588 A | 6/1992 |
| KR | 2010010217 | 2/2010 |
| WO | WO 86/02757 A1 | 5/1986 |
| WO | WO 86/07647 A1 | 12/1986 |
| WO | WO 88/03297 A1 | 5/1988 |
| WO | WO 89/08899 A1 | 9/1989 |
| WO | WO 91/09370 A1 | 6/1991 |
| WO | WO 93/09515 A1 | 5/1993 |
| WO | WO 94/10649 A1 | 5/1994 |
| WO | WO 94/28498 A1 | 12/1994 |
| WO | WO 95/03570 A2 | 2/1995 |
| WO | WO 97/46986 A1 | 12/1997 |
| WO | WO0060487 | 10/2000 |
| WO | WO2007133315 A2 | 11/2007 |
| WO | 2008102329 A2 | 8/2008 |
| ZA | 200709282 | 10/2007 |

OTHER PUBLICATIONS

Coady et al., "Targeted anti-poverty intervention: A selected annotated bibliography" (Apr. 2002), World Bank.

Notice of Allowance from co-pending U.S. Appl. No. 12/609,896 dated Jan. 3, 2012.

Notice of Allowance from co-pending U.S. Appl. No. 13/233,268 dated Dec. 13, 2011.

Office Action from co-pending U.S. Appl. No. 12/367,187 dated Jan. 6, 2012.

Office Action from co-pending U.S. Appl. No. 12/731,852 dated Dec. 22, 2011.

Business Dateline, Q Comm Expands Calling Card Products with Best Telecom Point-of-Sale Activated Cards; All Q Comm VeriFone Merchants Can Now Deliver Durable Calling Cards (Dec. 6, 2010), Business Wire (Dec. 8, 2011).

Notice of Allowance from co-pending U.S. Appl. No. 12/465,803 dated Dec. 20, 2011.

MasterCard Electronic prepaid (Oct. 2003). The Nilson Report, (798), (Dec. 9, 2011), The Banking Source (Document ID 474833171).

Co-pending U.S. Appl. No. 12/607,780, filed Oct. 28, 2009, titled Shopping Center Gift Card Office Fulfillment Machine, Program Product, and Associated Methods.

Co-pending U.S. Appl. No. 12/609,896, filed Oct. 30, 2009, titled Machine Methods, and Program Product for Electronic Order Entry.

Co-pending U.S. Appl. No. 12/626,349, filed Nov. 25, 2009, titled Machine, Methods, and Program Product for Electronic Inventory Tracking.

International Search Report for PCT/US09/56072 dated Oct. 20, 2009.

Bank Deals—Best Rates and Deals: EverBank's World Currency CDs—My Interview with EverBank's Executive Frank Trotter, http://bankdeals.blogspot.com, Jul. 29, 2007.

Foreign Exchange Market, http://en.wikipedia.org.

Avoid Gift Card Pitfalls, ConsumerReports.org.

VIPGift Receives Investment From Summit Partners and Bridgescale Partners, Nov. 11, 2008, Chattanooga, TN and Palo Alto, CA.

Downes, How to avoid exchange charges Wasting Money a foreign currency bank account could be the answer, The Daily Telegraph, London (UK), Mar. 10, 2007.

Office Action for co-pending U.S. Appl. No. 13/232,405 dated Feb. 2, 2012.

Office Action for co-pending U.S. Appl. No. 12/877,524 dated Feb. 14, 2012.

Notice of Allowance for co-pending U.S. Appl. No. 12/417,182 dated Feb. 14, 2012.

Final Office Action for co-pending U.S. Appl. No. 12/338,497 dated Mar. 1, 2012.

Final Office Action for co-pending U.S. Appl. No. 12/465,277 dated Feb. 28, 2012.

Co-pending U.S. Appl. No. 13/036,076, filed Feb. 28, 2011, titled Machine, Program Product, and Computer Implemented Method to Construct a Person-To-Person Loan.

Office Action dated Feb. 18, 2011, in co-pending U.S. Appl. No. 12/338,402.

Co-pending U.S. Appl. No. 12/562,331, filed Sep. 18, 2009, titled Computerized Extension of Credit to Existing Demand Deposit Accounts, Prepaid Cards and Lines of Credit Based on Expected Tax Refund Proceeds, Associated Systems and Computer Program Products.

Office Action dated Mar. 4, 2011, in co-pending U.S. Appl. No. 12/338,684.

Office Action dated Mar. 17, 2011, in co-pending U.S. Appl. No. 12/417,199.

Office Action dated Mar. 17, 2011, in co-pending U.S. Appl. No. 12/465,803.

Office Action dated Mar. 22, 2011, in co-pending U.S. Appl. No. 12/338,584.

Office Action dated Mar. 29, 2011, in co-pending U.S. Appl. No. 12/417,211.

Office Action dated Mar. 29, 2011, in co-pending U.S. Appl. No. 12/407,320.

Office Action for co-pending U.S. Appl. No. 12/607,780 dated Mar. 19, 2012.

Notice of Allowance for co-pending U.S. Appl. No. 12/465,803 dated Mar. 20, 2012.

Notice of Allowance for co-pending U.S. Appl. No. 12/562,331 dated Mar. 20, 2012.

Ex-parte Quayle Action for co-pending U.S. Appl. No. 12/700,681 dated Mar. 23, 2012.

Final Office Action for co-pending U.S. Appl. No. 12/389,749 dated Mar. 29, 2012.

(56) References Cited

OTHER PUBLICATIONS

Final Office Action for co-pending U.S. Appl. No. 12/731,852 dated Apr. 5, 2012.
Final Office Action for co-pending U.S. Appl. No. 12/465,306 dated Apr. 11, 2012.
Notice of Allowance for co-pending U.S. Appl. No. 13/349,423 dated Apr. 13, 2012.
Office Action for co-pending U.S. Appl. No. 12/877,490 dated Apr. 18, 2012.
Office Action for co-pending U.S. Appl. No. 12/892,847 dated Apr. 30, 2012.
Final Office Action for co-pending U.S. Appl. No. 12/338,440 dated Jan. 19, 2012.
Office Action for co-pending U.S. Appl. No. 12/465,306 dated Nov. 10, 2011.
Final Office Action for co-pending U.S. Appl. No. 12/338,540 dated Mar. 15, 2012.
Jane Boon Pearlstine, Lenders, Borrowers Hook Up Over the Web: Prosper.com and Other Sites Provide Forum for Individual Bidders Willing to Offer Small Loans, Wall Street Journal, May 20, 2006.
United Nations Conference on Trade and Development, E-Finance and Small and Medium-Size Enterprises (SMEs) in Developing and Transition Economies, UNCTAD Expert Meeting, Oct. 17, 2001.
Tim Jones, Paradigms lost, RSA Journal, Oct. 2006, pp. 28-31.
Diego Rumiany, Internet Bidding for Microcredit: making it work in the developed world, conceiving it for the developing world, Mar. 2007.
Stefan Heng, Thomas Meyer, and Antje Stobbe, Implications of Web 2.0 for financial institutions: Be a driver, not a passenger, Munich Personal RePEc Archive, Jul. 31, 2007.
Matt Flannery, Kiva and the Birth of Person to Person Microfinance, Innovations, pp. 31-56, Winter & Spring 2007.
Michael K Hulme and Collette Wright, Internet Based Social Lending: Past, Present and Future, Social Futures Observatory, Oct. 2006.
Richard W Coleman, Is the Future of the Microfinance Movement to be Found on the Internet?, International Trade and Finance Association Working Papers 2007.
Amanda Scott and Patrick Towell, The web we weave, Financial World, pp. 12-15, Nov. 2006.
Prosper, Access and Transparency through Person-to-Person Lending, FDIC Advisory Committee on Economic Inclusion, Mar. 28, 2007.
Co-pending U.S. Appl. No. 12/338,365, filed Dec. 18, 2008, titled "Transfer Account Systems, Computer Program Products, and Associated Computer-Implemented Methods".
Co-pending U.S. Appl. No. 12/338,402, filed Dec. 18, 2008, titled "Transfer Account Systems, Computer Program Products, and Associated Computer-Implemented Methods".
Co-pending U.S. Appl. No. 12/338,440, filed Dec. 18, 2008, titled "Transfer Account Systems, Computer Program Products, and Associated Computer-Implemented Methods".
Co-pending U.S. Appl. No. 12/338,497, filed Dec. 18, 2008, titled "Private Label Promotion Card System, Program Product, and Associated Computer-Implemented Methods".
Co-pending U.S. Appl. No. 12/338,540, filed Dec. 18, 2008, titled "Private Label Promotion Card System, Program Product, and Associated Computer-Implemented Methods".
Co-pending U.S. Appl. No. 12/338,584, filed Dec. 18, 2008, titled "Transfer Account Systems, Computer Program Products, and Methods to Prioritize Payments From Preselected Bank Accounts".
Co-pending U.S. Appl. No. 12/338,645, filed Dec. 18, 2008, titled "Transfer Account Systems, Computer Program Product, and Methods to Prioritize Payments from Preselected Bank Accounts".
Co-pending U.S. Appl. No. 12/338,684, filed Dec. 18, 2008, titled "Transfer Account Systems, Computer Program Products, and Associated Methods".
Co-pending U.S. Appl. No. 12/338,712, filed Dec. 18, 2008, titled "Computer-Implemented Methods, Program Product, and System to Enhance Banking Terms Over Time".
Co-pending U.S. Appl. No. 12/397,113, filed Mar. 3, 2009, titled "Person-to-Person Lending Program Product, System, and Associated Methods".
Co-pending U.S. Appl. No. 12/389,749, filed Feb. 20, 2009, titled "Methods to Advance Loan Proceeds on Prepaid Cards, Associated Systems and Computer Program Products".
Co-pending U.S. Appl. No. 12/417,211, filed Apr. 2, 2009, titled "System, Program Product, and Associated Methods to Autodraw for Micro-Credit Attached to a Prepaid Card".
Co-pending U.S. Appl. No. 12/417,182, filed Apr. 2, 2009, titled "System, Program Product, and Method to Authorize Draw for Retailer Optimization".
Co-pending U.S. Appl. No. 12/367,187, filed Feb. 6, 2009, titled "Government Targeted-Spending Stimulus Card System, Program Product and Computer-Implemented Methods".
Co-pending U.S. Appl. No. 12/407,320, filed Mar. 19, 2009, titled "Computerized Extension of Credit to Existing Demand Deposit Accounts, Prepaid Cards and Lines of Credit Based on Expected Tax Refund Proceeds, Associated Systems and Computer Program Products".
Co-pending U.S. Appl. No. 12/417,199, filed Apr. 2, 2009, titled "System, Program Product, and Associated Methods to Autodraw for Micro-Credit Attached to a Prepaid Card".
Office Action in co-pending U.S. Appl. No. 12/609,896 dated Apr. 5, 2011.
Co-pending U.S. Appl. No. 12/465,277, filed May 13, 2009, titled "System, Program Product, and Computer-Implemented Method for Loading a Loan on a Pre-Paid Card".
Co-pending U.S. Appl. No. 12/465,306, filed May 13, 2009, titled "System, Program Product, and Computer-Implemented Method for Loading a Loan on an Existing Pre-Paid Card".
Co-pending U.S. Appl. No. 12/465,803, filed May 14, 2009, titled "Pre-Paid Card Transaction Computer to Load a Loan on a Pre-Paid Card".
International Search Report dated May 18, 2009 for PCT/US2009/039495 filed Apr. 3, 2009 titled "System, Program Product, and Method for Debit Card and Checking Account Autodraw".
Orszag, Peter, "Unemployment Insurance as an Economic Stimulus", Center for Budget and Policy Priorities, Nov. 15, 2011.
Powell, Robert L., "Statewide Electronic Commerce Program Status Report", State of North Carolina Office of the State Controller, Mar. 7, 2007.
Parrott, James, "Jittery Wall Street, Calm City?", Gotham Gazette, Apr. 16, 2007.
Zandi, Mark, "Washington Throws the Economy a Rope", Moody's Economy.com, Jan. 22, 2008.
Blair, Christine E., et al., "Challenges to the Dual Banking System: The Funding of Bank Supervision", FDIC Bank Review, Mar. 31, 2006.
Office Action for co-pending U.S. Appl. No. 12/367,187 dated Jun. 27, 2011.
"Developing Asia and the World", Asian Development Bank 2002.
International Search Report from co-pending PCT Application No. PCT/US09/034692 dated Apr. 14, 2009.
International Search Report from co-pending PCT Application No. PCT/US08/087689 dated Jun. 17, 2009.
Notice of Allowance in co-pending U.S. Appl. No. 12/554,659 dated Aug. 2, 2011.
Office Action in co-pending U.S. Appl. No. 12/338,712 dated Jul. 28, 2011.
Office Action in co-pending U.S. Appl. No. 12/338,440 dated Aug. 1, 2011.
Financial Advice Investment Money Oct. 1st, 2009 at 5:50pm, HSBC Offshore Internet Banking.
Financial Advice Investment Money Oct. 1st, 2009 at 7:25am, HSBC Offshore Internet Banking.
International Search Report for PCT/US2009/043988 dated Jul. 14, 2009.
International Search Report for PCT/US2009/039492 dated May 14, 2009 P.
International Search Report dated May 27, 2009 for PCT/US2009/039504 filed Apr. 3, 2009.

(56) References Cited

OTHER PUBLICATIONS

International Search Report dated Jun. 8, 2009 for PCT/US2009/039512 filed Apr. 3, 2009.
International Search Report dated Jun. 30, 2009 for PCT/US2009/043978 filed May 14, 2009.
Office action from co-pending U.S. Appl. No. 12/338,497 dated Aug. 18, 2011.
Notice of Allowance of co-pending U.S. Appl. No. 12/417,199 dated Aug. 18, 2011.
Notice of Allowance of co-pending U.S. Appl. No. 12/417,211 dated Aug. 22, 2011.
Wolfe, Daniel, "An E-Variation on Payday Loan Theme", American Banker, Jul. 28, 2005.
"Letter of Credit Explained: What is Letter of Credit?", Dec. 26, 2005, pp. 1-2.
Office Action from co-pending U.S. Appl. No. 12/338,540 dated Sep. 1, 2011.
Notice of Allowance of co-pending U.S. Appl. No. 12/338,365 dated Sep. 1, 2011.
Office Action dated Jul. 9, 2010 for U.S. Appl. No. 12/338,365.
Office Action dated Jul. 9, 2010 for U.S. Appl. No. 12/338,645.
Co-pending U.S. Appl. No. 12/554,659, filed Sep. 4, 2009, titled "System, Method, and Program Product for Foreign Currency Travel Account".
Co-pending U.S. Appl. No. 12/554,432, filed Sep. 4, 2009, titled "System, Program Product and Methods for Retail Activation and Reload Associated with Partial Authorization Transactions".
Cross, Sam Y., All About . . . the Foreign Exchange Market in the United States, 1998, Federal Reserve Bank of New York.
Final Office Action in co-pending U.S. Appl. No. 12/338,584 dated Sep. 15, 2011.
Final Office Action in co-pending U.S. Appl. No. 12/338,684 dated Sep. 23, 2011.
Lazarus, David, "120% rate for Wells' Advances", Oct. 16, 2004, San Francisco Chronicle.
Office Action in co-pending U.S. Appl. No. 12/397,113 dated Sep. 30, 2011.
Notice of Allowance in co-pending U.S. Appl. No. 12/338,645 dated Oct. 3, 2011.
Office Action in co-pending U.S. Appl. No. 12/417,182 dated Sep. 28, 2011.
Zubko, N., "An Automotic Connection Electronic Transaction Tools Help Manufacturers Connect With Suppliers to Streamline Sourcing Efforts", Industry Week, Jul. 2008, pp. 26-27, vol. 257, No. 7.
Notice of Allowance from co-pending U.S. Appl. No. 12/609,896 dated Oct. 27, 2011.
Office Action from co-pending U.S. Appl. No. 12/465,277 dated Oct. 20, 2011.
Office Action from co-pending U.S. Appl. No. 12/562,331 dated Oct. 20, 2011.
Notice of Allowance from co-pending U.S. Appl. No. 12/407,320 dated Oct. 18, 2011.
Office Action dated Sep. 28, 2010 for co-pending U.S. Appl. No. 12/338,402, filed Dec. 18, 2008.
Office Action from co-pending U.S. Appl. No. 12/626,349, dated Nov. 22, 2011.
Wolf, File History of US 2005/0278347.
Check Cashers Move Into Cards, Accounts (Cover Story), ATM & Debit News [serial online], Apr. 20, 2006, 6(24), pp. 1-3, available from Business Source Complete, Ipswich, MA.
Mangu-Ward, K.; (Oct. 2009), Payday of Reckoning, Reason, 41(5), pp. 40-47, retrieved Jun. 15, 2012, from Research Library (Document ID:1861658171).
Wolf, Alan Steven, What to do when the Chain Breaks, Servicing Management, Feb. 1997, 3 pages.
99Bill Launches Installment Credit Services, (Aug. 21, 2008), PR Newswire, 2 pages, retrieved Jul. 9, 2012, from Business Dateline (Document ID: 1536854041).
Intralinks, Inc. Begins European Rollout of Its Proven Electronic Solution for Loan Syndication, London (Business Wire), Oct. 8, 1997, 3 pages.
Final Office Action for co-pending U.S. Appl. No. 13/232,405 dated May 22, 2012.
Office Action for co-pending U.S. Appl. No. 13/405,051 dated Jun. 6, 2012.
Final Office Action co-pending U.S. Appl. No. 12/877,524 dated Jun. 8, 2012.
Notice of Allowance for co-pending U.S. Appl. No. 12/700,681 dated Jun. 11, 2012.
Notice of Allowance for co-pending U.S. Appl. No. 13/365,982 dated Jun. 26, 2012.
Office Action for co-pending U.S. Appl. No. 12/554,432 dated Jun. 29, 2012.
Office Action for co-pending U.S. Appl. No. 13/349,290 dated Jul. 3, 2012.
Notice of Allowance for co-pending U.S. Appl. No. 12/338,540 dated Jul. 9, 2012.
Office Action for co-pending co-pending U.S. Appl. No. 13/282,186 dated Jul. 13, 2012.
Notice of Allowance for co-pending U.S. Appl. No. 13/330,397 dated Jul. 18, 2012.
Final Office Action for co-pending U.S. Appl. No. 12/367,187 dated Jul. 19, 2012.
Final Office Action for co-pending U.S. Appl. No. 13/232,700 dated Jul. 19, 2012.
Final Office Action for co-pending U.S. Appl. No. 12/626,349 dated Jul. 20, 2012.
Office Action for co-pending U.S. Appl. No. 13/036,076 dated Jul. 24, 2012.
Notice of Allowance for co-pending U.S. Appl. No. 13/481,950 dated Jul. 30, 2012.
Notice of Allowance for co-pending U.S. Appl. No. 13/405,079 dated Aug. 6, 2012.
Notice of Allowance for co-pending U.S. Appl. No. 13/474,519 dated Aug. 27, 2012.
Office Action for co-pending U.S. Appl. No. 12/889,281 dated Aug. 30, 2012.
Notice of Allowance for co-pending U.S. Appl. No. 13/232,405 dated Sep. 4, 2012.
Notice of Allowance for co-pending U.S. Appl. No. 12/338,497 dated Sep. 17, 2012.
Notice of Allowance for co-pending U.S. Appl. No. 12/877,490 dated Sep. 20, 2012.
Office Action for co-pending U.S. Appl. No. 13/214,126 dated Oct. 4, 2012.
Notice of Allowance for co-pending U.S. Appl. No. 12/607,780 dated Oct. 9, 2012.
Final Office Action for co-pending U.S. Appl. No. 13/232,700 dated Oct. 12, 2012.
Office Action co-pending U.S. Appl. No. 13/284,524 dated Oct. 15, 2012.
Notice of Allowance co-pending U.S. Appl. No. 13/601,724 dated Oct. 18, 2012.
Office Action co-pending U.S. Appl. No. 13/536,765 dated Nov. 30, 2012.
VeriFone Everest Advertisement, Stores, May 1995 (2 pages).
VeriFone Folio (TM) Brings Credit and Debit Card Payment to the Restaurant Table, PR Newswire, May 16, 1994 (3 pages).
VeriFone Introduces Pinpad (TM) 1000 to Point-of-Sale Debit Market, M2 Presswire, Apr. 21, 1995 (1 page).
VeriFone TCL Terminal Control Language Programmer's Manual, VeriFone Part No. 00368-01, Revision G, Manual Revision 8.0, Aug. 1992 (362 pages).
VeriFone Tranz 330 Reference Manual, Verifone Part No. 00483-Revision D, Manual Revision 3.01, Apr. 1990 (144 pages).
Caskey et al., Is the Debit Card Revolution Finally Here?, Federal Reserve Bank of Kansas City, Economic Review; Fourth Quarter 1994; vol. 79 #4; pp. 79-95.
Castaneda, Laura, Business Promote Services to Customers Day In and Day Out, The Dallas Morning News, Nov. 26, 1994 (3 pages).

(56) References Cited

OTHER PUBLICATIONS

Bank of Boulder POS Debit Solution at the Table Now in Beta: First Bank to Certify IVI Spirit C2000 on MAPP (R), Business Wire, Aug. 3, 1994 (1 page).
Barnes, David B., VeriFone Introduces Everest (TM) Customer Activated Payment System to Multi-lane Retail Market, PR Newswire, Feb. 20, 1995 (2 pages).
Brown, Suzanne, Goodnight Amy, Meg, Beth and Jo, Rocky Mountain News, Dec. 8, 1994 (1 page).
Cohen, Bruce, Alternative to Cash Gains Ground, The Financial Post, Apr. 22, 1994 (2 pages).
Credit Terminals to be Used at Canadian Liquor Outlets, Card News, Jan. 23, 1995 (1 page).
Debit Card Popularity on the Rise, Chain Store Age Executive, Jan. 1994 (1 page).
Debit Goes to Dinner, Credit Card Management, New York, Oct. 1994 (2 pages).
Everest Reference Manual, VeriFone Part No. 25399, Revision A, Manual Revision 1.0, Jul. 1995 (66 pages).
Express Cards and Trains, Chain Store Age Executive Edition, Jan. 1995 (1 page).
Final Office Action for co-pending U.S. Appl. No. 12/889,281 dated Apr. 8, 2013.
Final Office Action for co-pending U.S. Appl. No. 12/892,847 dated Mar. 29, 2013.
Final Office Action for co-pending U.S. Appl. No. 13/036,076 dated Apr. 8, 2013.
Final Office Action for co-pending U.S. Appl. No. 13/214,126 dated Aug. 1, 2013.
Final Office Action for co-pending U.S. Appl. No. 13/349,290 dated Mar. 14, 2013.
Fox, Linda A., Keep an Eye on Your Credit Card, The Toronto Sun, Aug. 9, 1996 (1 page).
Garriss, J., (2004), Forging an ideal HSA, Workspan, 47(5), 18-25, Retrieved Sep. 3, 2013.
Hypercom S7C Advertisement, Chain Store Age, Sep. 1995 (4 pages).
Hypercom S7SC Advertisement, Chain Store Age, Feb. 1996 (2 pages).
IBM 4680 General Sales Application Electronic Funds Transfer User's Guide, IBM Corp., Research Triangle Park, NC, Dec. 1990 (260 pages).
IBM 4680 General Sales Application Electronic Funds Transfer User's Guide, IBM Corp., Research Triangle Park, NC, Mar. 1991 (263 pages).
IBM 4680 General Sales Application: Guide to Operations, Research Triangle Park, NC, Jun. 1991 (422 pages).
IBM 4680-4690 Advanced Payment System for Chain Drug Sales Application User's Guide, Jul. 1996 (248 pages).
IBM 4680-4690 Advanced Payment System for Chain Drug Sales Application User's Guide, Nov. 1996 (256 pages).
IBM 4680-4690 Advanced Payment System for Supermarket Application User's Guide, Sep. 1996 (222 pages).
IBM 4680-4690 Supermarket Application—Electronic Funds Transfer Feature Enhancement: User's Guide, IBM Corp., Research Triangle Park, NC, Sep. 1995 (318 pages).
Klein, Robert J., Here Comes the Debit Card, D&B Reports, Jul./Aug. 1990 (2 pages).
Krino et al., A Birthday Card That Pays Off, The Orange County Register, Jul. 19, 1996 (2 pages).
Mannix, Margaret, Checkout Tech, U.S. News and World Report, Feb. 27, 1995 (3 pages).
Microtrax Electronic Payment Systems: The MicroTrax Pinstripe Lane Equipment Users Guide, MicroTrax Ltd., Newport Beach, CA, 1991 (54 pages).
Microtrax Ltd. Omni 490M (and 490ML) Operation Manual for Integrated and Non-Integrated Configurations, 1994 (60 pages).
Microtrax Ltd., PC Electronic Payment Systems Reference Manual; 1995 (381 pages).
NCR 4430-5000 MSR/PIN User's Guide, 1994 (265 pages).
Neiman Marcus Express Card Advertisement, The New Yorker, Dec. 12, 1994 (3 pages).
Neiman Marcus to Launch NM Express Automated Gift Card, PR Newswire, Nov. 22, 1994 (2 pages).
Nieman Marcus Offers Electronic Gift Certificate, Card Fax, Jan. 23, 1995 (1 page).
Nieman Marcus: High-Tech for the Holidays, ADWEEK, Dec. 5, 1994 (1 page).
Office Action for co-pending U.S. Appl. No. 12/367,187 dated Aug. 1, 2013.
Office Action for co-pending U.S. Appl. No. 12/397,113 dated Oct. 15, 2013.
Office Action for co-pending U.S. Appl. No. 12/626,349 dated Nov. 27, 2013.
O'Keefe, Michael, Portable POS Debit Terminal Mean Greater Convenience, Bank Systems & Technology, Nov. 1994 (2 pages).
Omni 480/490 Programmer's Guide, VeriFone Part No. 12924—Revision A, Manual Revision 1.0, Oct. 1993 (228 pages).
One Company's Diversification Shakes Up Peripherals Market, Chain Store Age, Jun. 1996 (3 pages).
Peppard, Alan, Down and Dirty in Deep Ellum, The Dallas Morning News, Dec. 3, 1994 (2 pages).
POS Terminal Can Handle Direct Debits, ABA Banking Journal, Sep. 1984 (2 pages).
Pyatt, Rudolph A., Jr., Mobil Stations to Permit Use of Bank Cards, The Washington Post (1 page).
Racal Corp. Advertisement, POS Terminal Eliminates Credit Card Vouchers, ABA Banking Journal, Nov. 1985 (2 pages).
Service Mark Registration No. 1,981,044 for "NM Express Card" registered Jun. 18, 1996 (1 page).
Szabo, Joan C., The Changing World of Financial Services, Nation's Business, Oct. 1994 (7 pages).

* cited by examiner

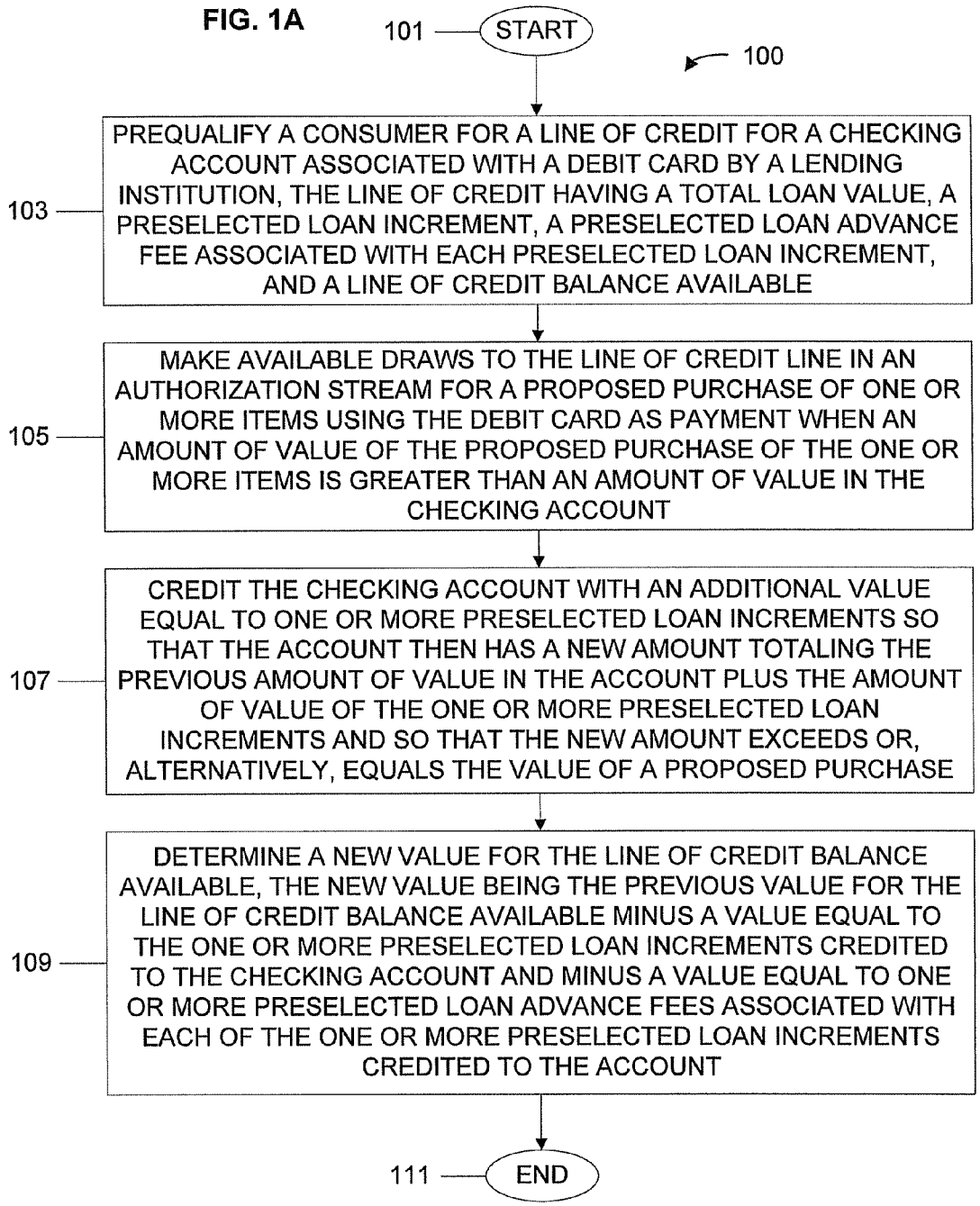

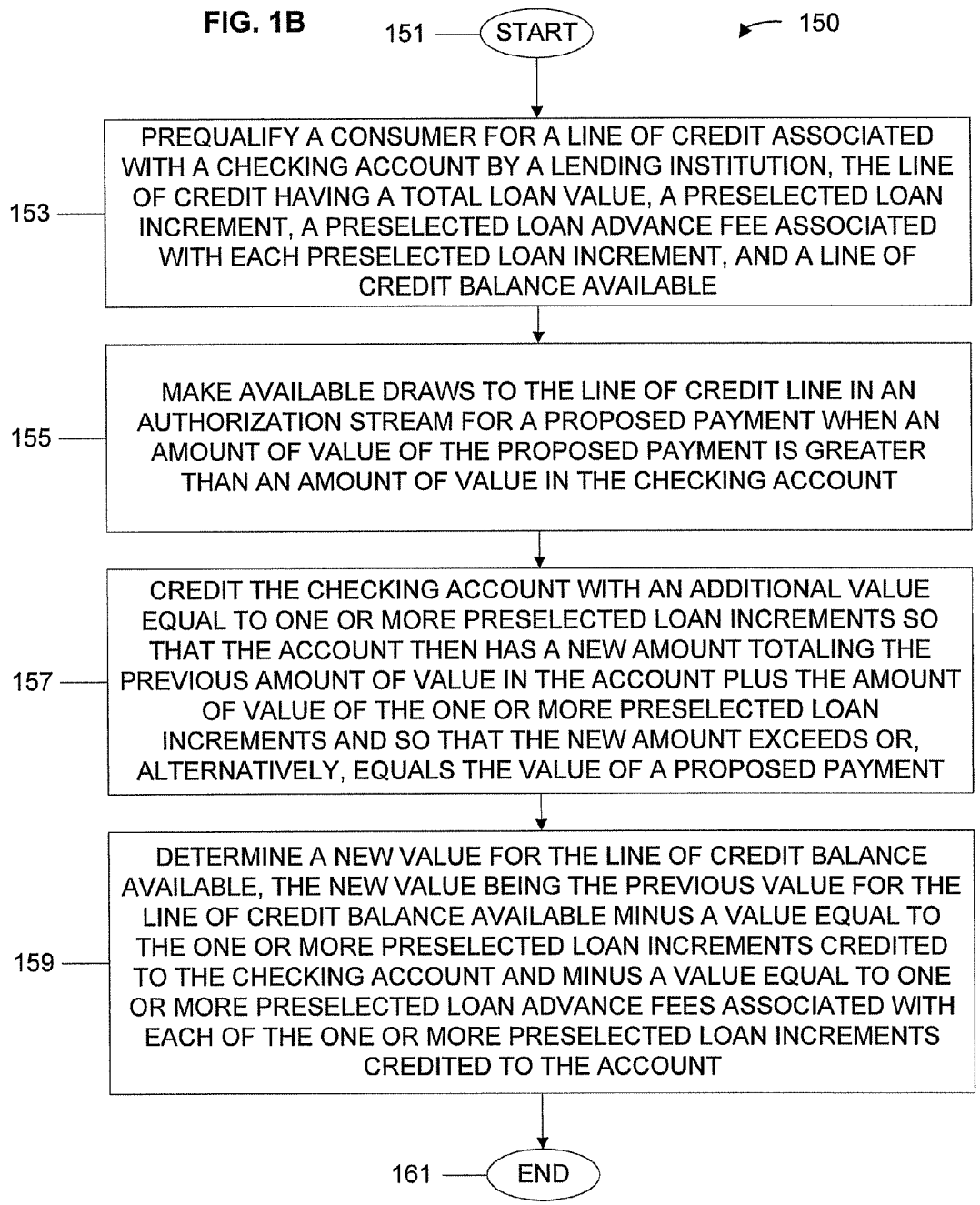

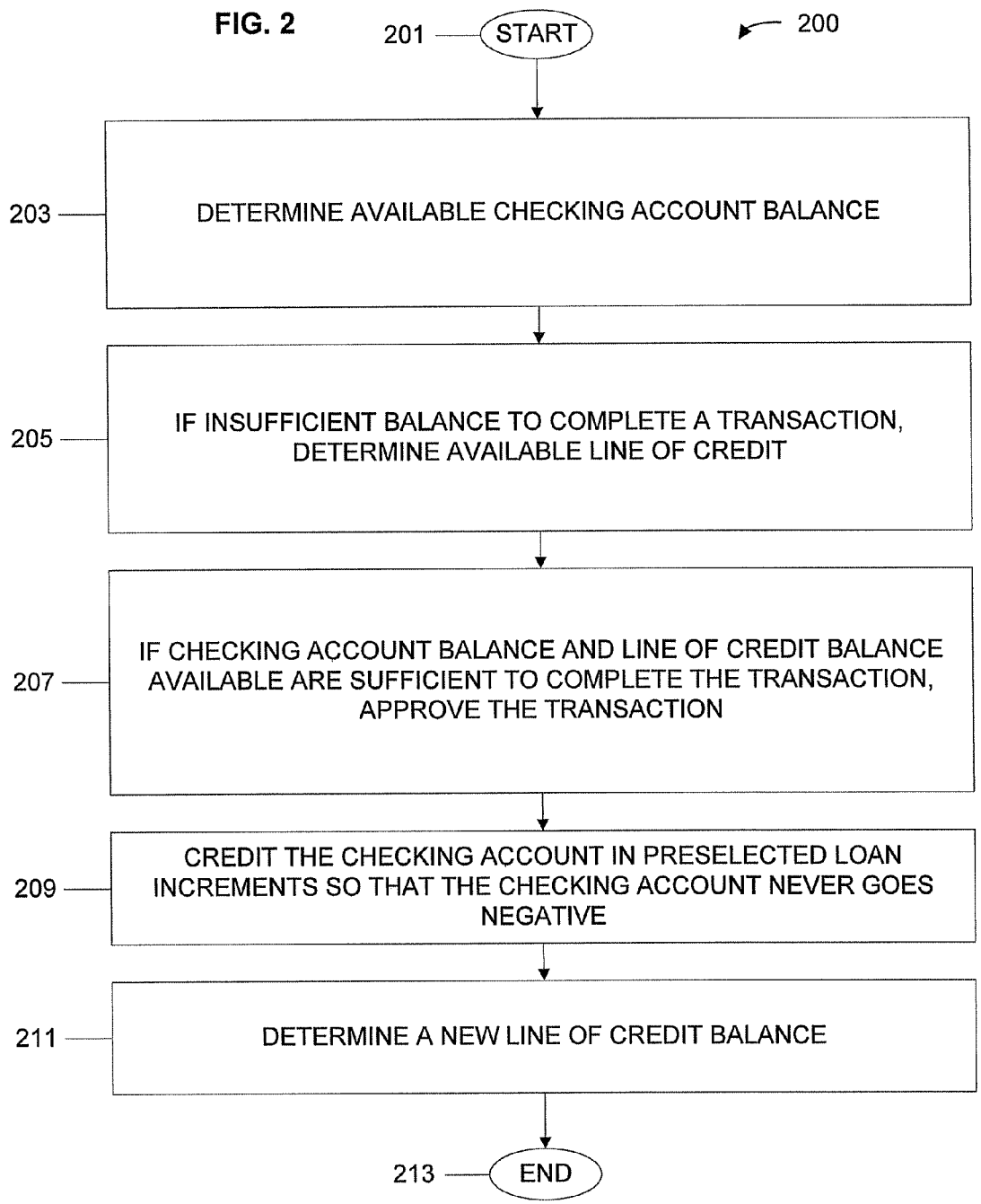

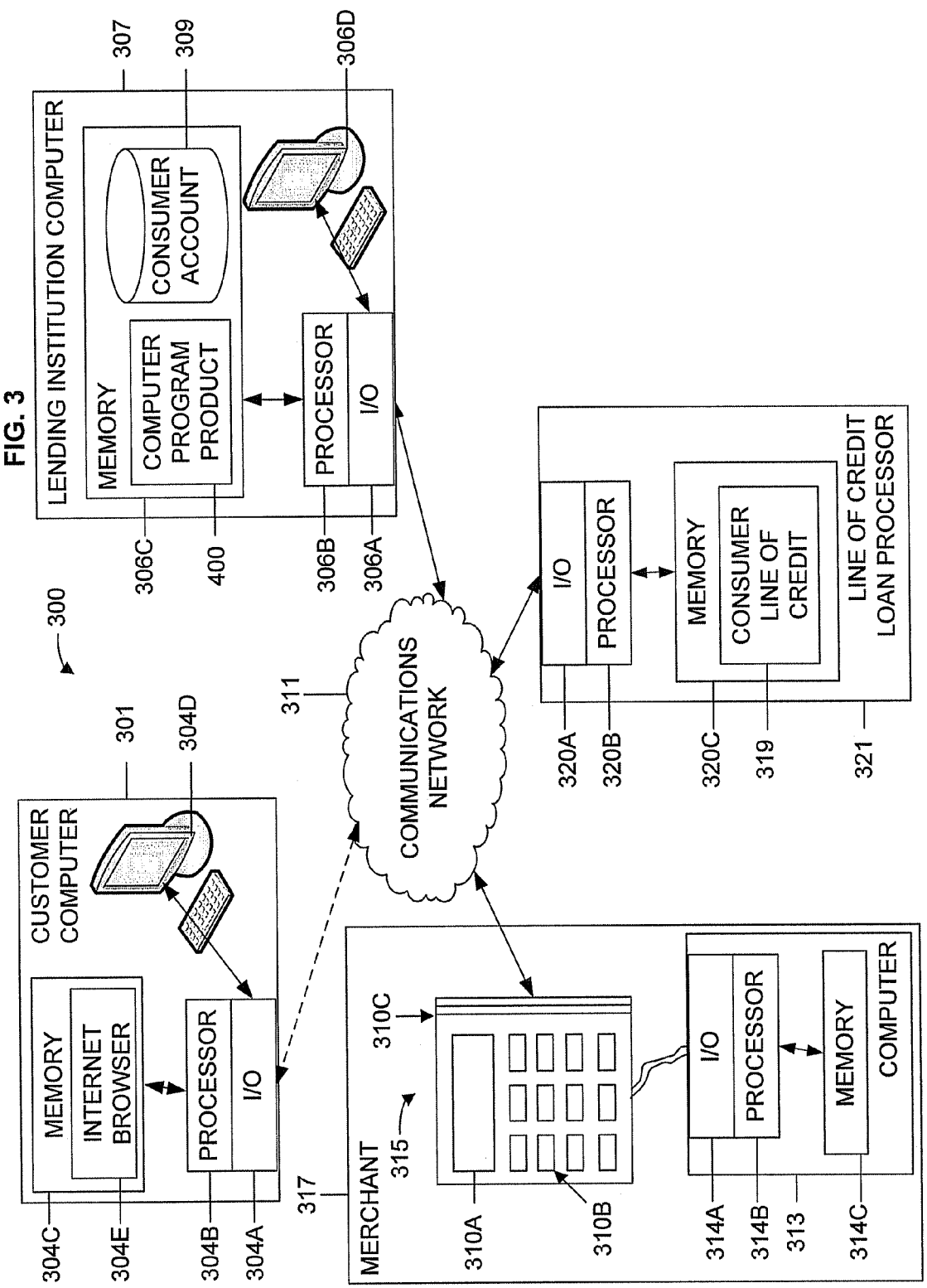

| Browser Tool Bar |
|---|
| Create New Account |
| Complete the fields below to set up Customer Line of Credit ("LOC") account. Click on the CONTINUE button for next screen. The CANCEL button returns you to the Log-In page without saving any changes.<br>Required fields are marked *<br>LOC Account Details<br>    Create User ID    [ ]<br>    Create Password    [ ]<br>    Confirm Password    [ ]<br>Verification Information<br>    Prepaid Card Number    [ ]<br>    Last 4 Digits of Your SSN    [ ]<br>    Year of Birth    [ ]<br>E-mail Account Details (*optional*)<br>    E-mail Address    [ ]<br>    Confirm E-Mail Address    [ ] |
| Computer Screen Interface Menu |

FIG. 11

WWW.XXXXX.COM

ACCOUNT ACTIVITY STATEMENT

ACCOUNT XXXX XXXX XXXX XXXX

| DATE | DESCRIPTION | CREDIT | DEBIT | BAL. | LOC AVAIL. | LOC BAL. |
|---|---|---|---|---|---|---|
| 1/1/2009 | BALANCE | | | $ 21 | $ 60 | $ 0 |
| 1/2/2009 | LOC ADVANCE & FEE (Fee = 2 X $2.50 PER $20 INCREMENT) | $ 40 | | $ 61 | $ 15 | $ 45 |
| 1/2/2009 | GOODS PURCHASE | | $ 42 | $ 19 | $ 15 | $ 45 |
| 1/15/2009 | PAYCHECKCO. | $ 750 | | $ 769 | $ 15 | $ 45 |
| 1/15/2009 | LOC REPAYMENT | | $ 45 | $ 724 | $ 60 | $ 0 |
| 1/16/2009 | LINE OF CREDIT INCREASE | | | $ 724 | $ 90 | |

SYSTEM, PROGRAM PRODUCT, AND METHOD FOR DEBIT CARD AND CHECKING ACCOUNT AUTODRAW

RELATED APPLICATIONS

This application claims priority to and the benefit of: U.S. Provisional Patent Application Ser. No. 61/042,612, by Ahlers et al., titled "System, Program Product, and Methods to AutoDraw for Micro-Credit Attached to a Prepaid Card" filed Apr. 4, 2008; U.S. Provisional Patent Application Ser. No. 61/042,624, by Crowe et al., titled "System, Program Product, and Method to Authorize Draw for Retailer Optimization" filed on Apr. 4, 2008; and U.S. Provisional Patent Application Ser. No. 61/082,863, by Ahlers et al., titled "System, Program Product, and Method for Debit Card and Checking Account AutoDraw" filed on Jul. 23, 2008, all of which are each incorporated herein by reference in their entireties. This application also relates to: U.S. Provisional Patent Application Ser. No. 61/016,213, by Sorbe et al., titled "Transfer Account Systems, Computer Program Products, and Associated Methods" filed on Dec. 21, 2007; U.S. Provisional Patent Application Ser. No. 61/052,454, by Sorbe et al., titled "Transfer Account Systems, Computer Program Products, and Methods to Prioritize Payments from Preselected Bank Account" filed May 12, 2008; U.S. Provisional Patent Application Ser. No. 61/029,975, by Sorbe et al., titled "Methods To Advance Loan Proceeds On Prepaid Cards, Associated Systems and Computer Program Products" filed on Feb. 20, 2008; U.S. Provisional Patent Application Ser. No. 61/042,612, by Ahlers et al., titled "System, Program Product, and Associated Methods to Authorize Draw for Micro-Credit Attached to a Prepaid Card" filed on Apr. 4, 2008; U.S. Provisional Patent Application Ser. No. 61/032,750, by Ahlers et al., titled "Methods, Program Product, and System for Micro-Loan Management" filed on Feb. 29, 2008; U.S. Provisional Patent Application Ser. No. 61/060,559, by Galit et al., titled "Methods, Program Product, and System to Enhance Banking Terms Over Time" filed on Jun. 11, 2008; U.S. Provisional Patent Application Ser. No. 61/082,863, by Ahlers et al., titled "System, Program Product, and Method For Debit Card and Checking Account Autodraw" filed on Jul. 23, 2008; U.S. Provisional Patent Application Ser. No. 61/053,056, by Galit et al., titled "System, Program Product, and Method For Loading a Loan On a Pre-Paid Card" filed on May 14, 2008, all of which are each incorporated herein by reference in their entireties. This application also relates to: U.S. patent application Ser. No. 12/338,365, by Sorbe et al., titled "Transfer Account Systems, Computer Program Products, and Associated Computer-Implemented Methods" filed on Dec. 18, 2008; U.S. patent application Ser. No. 12/338,402, by Sorbe et al., titled "Transfer Account Systems, Computer Program Products, and Associated Computer-Implemented Methods" filed on Dec. 18, 2008; U.S. patent application Ser. No. 12/338,440, by Sorbe et al., titled "Transfer Account Systems, Computer Program Products, and Associated Computer-Implemented Methods" filed on Dec. 18, 2008; U.S. patent application Ser. No. 12/338,584, by Sorbe et al., titled "Transfer Account Systems, Computer Program Products, and Computer-Implemented Methods to Prioritize Payments from Preselected Bank Account" filed Dec. 18, 2008; U.S. patent application Ser. No. 12/338,645, by Sorbe et al., titled "Transfer Account Systems, Computer Program Products, and Computer-Implemented Methods to Prioritize Payments from Preselected Bank Account" filed Dec. 18, 2008; U.S. patent application Ser. No. 12/389,749, by Sorbe et al., titled "Methods to Advance Loan Proceeds on Prepaid Cards, Associated Systems and Computer Program Products" filed on Feb. 20, 2009; PCT/US09/34692, by Sorbe et al., titled "Methods to Advance Loan Proceeds on Prepaid Cards, Associated Systems and Computer Program Products" filed on Feb. 20, 2009; U.S. patent application Ser. No. 12/417,199, by Ahlers et al., titled "System, Program Product, and Associated Methods to Authorize Draw for Micro-Credit Attached to a Prepaid Card" filed on the same day herewith; U.S. patent application Ser. No. 12/417,211, by Ahlers et al., titled "System, Program Product, and Associated Methods to Authorize Draw for Micro-Credit Attached to a Prepaid Card" filed on the same day herewith; U.S. patent application Ser. No. 12/417,182, by Crowe et al., titled "System, Program Product, and Method to Authorize Draw for Retailer Optimization" filed on the same day herewith; U.S. patent application Ser. No. 12/338,684, by Ahlers et al., titled "Computer-Implemented Methods, Program Product, and System for Micro-Loan Management" filed on Dec. 18, 2008; PCT/US08/87660 by Ahlers et al., titled "Computer-Implemented Methods, Program Product, and System for Micro-Loan Management" filed on Dec. 19, 2008; U.S. patent application Ser. No. 12/338,712, by Galit et al., titled "Computer-Implemented Methods, Program Product, and System to Enhance Banking Terms Over Time" filed on Dec. 18, 2008; and PCT/US08/87689 by Galit et al., titled "Computer-Implemented Methods, Program Product, and System to Enhance Banking Terms Over Time" filed on Dec. 19, 2008, all of which are each incorporated herein by reference in their entireties.

BACKGROUND

1. Field of Invention

The present invention relates generally to the financial service and banking product industries, and, more particularly, to systems, computer program products, and associated methods of providing an automatic credit line draw in preselected increments for a checking account, including a checking account accessed through a debit card.

2. Background

It is known that tens of millions of consumers in the US have either limited or no access to traditional credit, either as a result of poor or limited credit history. It is also recognized that non-traditional short-term lending, including, e.g., payday loans, payday advances, and other short-term cash advances, is a $20 billion plus per year industry. Non-traditional loans, however, involve the hassles of applying for and obtaining the loan prior to the consumer having access to the funds. In addition, inherent in requesting a loan is determining an amount of the loan. If the loan amount is too small, the consumer may need to obtain an additional loan, with additional fees; if the loan amount is too large, the consumer will needlessly pay extra interest.

It is further recognized that financial institutions earn an estimated $17 billion annually by charging overdraft fees to their checking account customers. These fees are sometimes charged in ways that raise concerns among certain consumer protection groups For example, a $1 overdraft can generate a $35 fee, and a consumer may not realize an overdraft has taken place and would have preferred to not be charged a fee rather than complete the transaction.

It is also known to use a debit card as payment for a proposed purchase at a merchant. The consumer proposes a purchase and submits the debit card to the merchant so that the merchant can request authorization from a bank associated with the debit card. That is, the merchant checks that funds are available in the checking account associated with the debit card to cover the amount of the proposed purchase.

This authorization process also provides an opportunity for security services, such as, for example, verifying of a Personal Identification Number (PIN) and determining if the card has been reported as stolen. If there are insufficient funds available in the checking account associated with the debit card to cover the amount of the proposed purchase, the authorization request is denied by the bank, and the proposed purchase is rejected by the merchant. Embarrassed and disappointed, many rejected consumers quickly give up and leave the merchants premises so that even if a loan or credit were readily available with minimal effort, such as, for example, by placing a short phone call to the bank or another lending institution, the proposed purchase is abandoned.

It is further known that there are additional ways for consumers to access the funds in checking accounts in addition to debit cards, including, for example, checks, bill payment services, wire transfers, and other withdrawals. Because consumers can use one or all of these tools to make payments from a checking account, each of these ways to access funds can trigger an overdraft.

SUMMARY OF INVENTION

In view of the foregoing, Applicants have recognized one or more sources of many of these problems and provides enhanced embodiments of methods, e.g., computerized methods, of advancing one or more preselected loan increments to a checking account, e.g., a checking accessed with a debit card, and associated systems and computer program products. A debit card provides an alternative payment method to cash or credit when making purchases. While having a similar look and feel to a credit card, a debit card functions more like writing a check as the funds are typically withdrawn directly from the cardholder's bank account without the payment of interest. As such, debit cards are also referred to as check cards. Also, a debit card is generally attached to a bank account and acts as a means of accessing funds, or money, from the account similar to an automated teller machine (ATM) card or as a means of directly paying a merchant for the cost of purchases from the consumer's bank account. A checking account, also known as, for example, a demand account, demand deposit account, negotiable order of withdrawal (NOW) account, or other similar account, is a bank account or deposit account held at a bank or other financial institution wherein the money deposited in the account is available on demand through various means, including checks, debit cards, bill payment services, check cards, wire transfers, and others as understood by those skilled in the art.

Embodiments of the present invention provide, for example, a computer-implemented method of accessing a line of credit associated with a checking account. Embodiments include the use of a debit card or other checking account spending device as understood by those skilled in the art. The computer-implemented method can include a lending institution computer prequalifying a consumer for a line of credit for a checking account responsive to consumer underwriting data and predetermined qualification parameters to thereby convert consumer underwriting data into line of credit data. The computer-implemented method can include making available draws to the line of credit line in an authorization stream for a proposed payment, including proposed payments using a debit card or other checking account spending device and including proposed payments received by the lending institution computer through the electronic communications network from a point of sale terminal associated with a merchant. The line of credit has a total loan value, a preselected loan increment, a preselected loan advance fee associated with each preselected loan increment, and a line of credit balance available. The total loan value represents a maximum amount of value available to the consumer from the lending institution via a line of credit associated with the checking account as understood by those skilled in the art. The computer-implemented method also includes crediting the checking account with an additional value equal to one or more preselected loan increments so that the account then has a new amount totaling a previous amount of value in the account plus the amount of value of the one or more preselected loan increments and so that the new amount exceeds or, alternatively, equals the value of the proposed transaction to thereby convert line of credit data into a value associated with the checking account to thereby fund the proposed payment. The computer-implemented method further includes determining a new value for the line of credit balance available. The new value is a previous value for the line of credit balance available minus the value credited to the checking account and minus fees, as each of the one or more preselected loan increments credited to the checking account generates a preselected loan advance fee.

By prequalifying the consumer for the line of credit and making draws to the line of credit available in the authorization stream for a purchase or a transaction, embodiments of the present invention advantageously allow a consumer to avoid the planning and hassle associated with determining the amount of a loan prior to proposing a purchase. Previously, a consumer would have to determine the amount of the loan necessary to fund the proposed purchase, then secure the loan, and only then propose the purchase at a merchant using, for example, a debit card. If the information necessary to determine the amount of the loan exists only at the merchant, multiple trips to the merchant may be required. Under the embodiments of the present invention, however, multiple trips are not required as the amount of the loan is determined, up to the total loan value, in the authorization stream for a proposed payment, resulting in fewer rejections of proposed purchases, less embarrassment for consumers, and reduced cost due to fewer abandoned sales as understood by those skilled in the art. Advantageously, under the embodiments of the present invention, the consumer only pays for what is actually drawn.

By crediting the checking account in preselected loan increments, embodiments of the present invention advantageously can guarantee a fee structure that is proportional to the amount of credit accessed. By comparison, an overdraft fee charge by a bank for "bounced" check is often larger than the overdraft amount. Instead, the fee structure according to embodiments of the present invention more closely resembles an automated teller machine (ATM) fee from a consumer's point of view as understood by those skilled in the art. In addition, the use of preselected loan increments can often result in value remaining in the checking account, allowing for small transactions without generating additional loan fees. For example, after of a credit of a preselected loan increment of $50 and subsequent purchase transaction, the balance in the checking account ranges from $0.00 to $49.99.

According to other embodiments of the present invention, prequalifying a consumer for a line of credit for a checking account, e.g., a checking account associated with a debit card or other checking account payment device, can include, for example, the consumer opting in to a program with the lending institution using a written correspondence from the consumer, a consumer selection on a website, a telephone conversation with an interactive voice response unit, a telephone conversation with a customer service representative, a mobile phone, or a combination thereof as understood by those skilled in the art. That is, embodiments of the present invention provide numerous flexible and convenient ways to initiate the prequalification process. A line of credit amount, for example, can be established based on direct deposit and preselected underwriting formula, as understood by those skilled in the art, that use the amount of direct deposits, among other factors, to determine the size of the credit line available.

According to other embodiments of the present invention, the amount of value of the proposed purchase of the one or more items can include adjustments for coupons, discounts; instant rebates, and sales tax, or a combination thereof as understood by those skilled in the art.

Embodiments of the present invention provide, for example, a system of advancing one or more preselected loan increments to a checking account, e.g., a checking account associated with a debit card. The system includes a lending institution computer positioned to manage a line of credit associated with a checking account, i.e., to control access to funds from a line of credit associated with a checking account; a plurality of merchant computers positioned to determine an amount of value of a proposed purchase of one or more items; and a plurality of point-of-sale terminals, each associated with one or more merchant computers and in communication, through an electronic communications network, with the lending institution computer. The system further includes a computer program product associated with the lending institution computer as discussed below.

Embodiments of the present invention provide, for example, a computer program product associated with the lending institution computer, stored on a tangible computer readable memory media, and operable on a computer, the computer program product comprising a set of instructions that, when executed by the computer, cause the computer to perform various operations. The operations include prequalifying a consumer for a line of credit for a checking account, e.g., a checking account associated with a debit card, by the lending institution responsive to consumer underwriting data and predetermined qualification parameters to thereby convert consumer underwriting data into line of credit data. The operations include making available draws to the line of credit line in an authorization stream for a proposed payment, e.g., a proposed purchase of one or more items using the debit card as payment. The proposed payment can be, for example, received by the lending institution computer through the electronic communications network from a point of sale terminal associated with a merchant. The operations further include crediting the checking account with an additional value equal to one or more preselected loan increments so that the account then has a new amount totaling a previous amount of value in the account plus the amount of value of the one or more preselected loan increments and so that the new amount exceeds or, alternatively, equals the value of a proposed purchase to thereby convert line of credit data into a value associated with the checking account to thereby fund the proposed payment. The operations also include determining a new value for the line of credit balance available, in which the new value is a previous value for the line of credit balance available minus a value equal to the one or more preselected loan increments credited to the checking account and minus a value equal to one or more preselected loan advance fees associated with each of the one or more preselected loan increments credited to the account.

Embodiments of the present invention, for example, include a plurality of financial institutions interacting to provide various features and benefits. For example, a first financial institution, e.g., a lending institution, can offer lending services and provide the line of credit to the consumer, while a second financial institution can provide the checking account and associated services to the consumer. Embodiments of the present invention include, for example, a gateway model between the lending institution and checking account institution, in which the checking account institution notifies the lending institution for a particular request for credit, allowing the lending institution to make the decision for the particular request. In an alternate embodiment, the lending institution pushes line of credit information to the checking account institution, allowing the checking account institution to make the decision to extend credit for a particular transaction responsive to the information from the lending institution so that the checking account institution can grant authorization of a request in real time. In another embodiment, a file integration of the core bank system between the lending institution and the checking account institution can allow the checking account institution to make the decision to extend credit for a particular transaction responsive to the information from the lending institution so that the checking account institution can grant authorization of a request in real time. Similarly, a file integration of the core bank system between the lending institution and the checking account institute can facilitate repayment of the line of credit and associated fees. Other repayment mechanisms can include, for example, the routing or rerouting of direct deposits to the lending institution, as well as scheduled or automatic repayments from the checking account or yet another account. In addition, a loan processor, e.g., a third financial institution, acting on behalf or in service of the lending institution, can prequalify the consumer for the line of credit responsive to the lending institution's criteria. These embodiments promote flexibility and enable lending and financial institutions to partner with other lending and financial institutions, when appropriate, to maximize account options and line of credit options for the consumer.

According to another embodiment of the present invention, the lending institution can be a federally-chartered bank subject to federal banking laws and regulations and not subject to state banking laws and regulations. Also, the line of credit program can be a bank product so that the line of credit program complies with federal Regulation Z.

Embodiments of the present invention also provide, for example, a computer-implemented method of accessing a line of credit. The computer-implemented method includes a lending institution computer prequalifying a consumer for a line of credit for a checking account responsive to consumer underwriting data and predetermined qualification parameters to thereby convert consumer underwriting data into line of credit data. Draws to the line of credit line are made available in an authorization stream for a proposed payment. The proposed payment can involve one or more of the following: a check, an electronic check, a debit card, an electronic bill payment, an automated teller machine (ATM) withdrawal, and a wire transfer. The proposed payment can be, for example, received by the lending institution computer through the electronic communications network from a point of sale terminal associated with a merchant. The computer-implemented method also includes crediting the checking account with an additional value equal to one or more preselected loan increments so that the account then has a new amount totaling a previous amount of value in the account plus the amount of value of the one or more preselected loan increments and so that the new amount exceeds or, alternatively, equals the value of the proposed payment to thereby convert line of credit data into a value associated with the checking account to thereby fund the proposed payment. The method further includes determining a new value for the line of credit balance available. The new value is a previous value for the line of credit balance available minus the value credited to the account and minus fees, as each of the one or more preselected loan increments credited to the account generates a preselected loan advance fee.

In addition, embodiments of the present invention include systems, program products, and associated methods of advancing one or more preselected loan increments to a checking account, e.g., a checking account associated with a debit card, and accessing a line of credit with a debit card or other checking account spending device, as will be understood by those skilled in the art.

BRIEF DESCRIPTION OF DRAWINGS

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

FIG. 1A is a schematic flow diagram of a method of accessing a line of credit with a debit card according to an embodiment of the present invention;

FIG. 1B is a schematic flow diagram of a method of accessing a line of credit according to an embodiment of the present invention;

FIG. 2 is a schematic flow diagram of a consumer transaction according to an embodiment of the present invention;

FIG. 3 is a schematic block diagram of a system of advancing one or more preselected loan increments to a checking account according to an embodiment of the present invention;

FIG. 6 is a schematic front elevational view of an embodiment of an access interface of a program product and system in the form of a graphical user interface of a display of a computer according to an embodiment of the present invention;

FIG. 11 is a front plan view of a display screen of a computer displaying an excerpt of an account activity statement according to an embodiment of the present invention.

DETAILED DESCRIPTION

Figure 4:
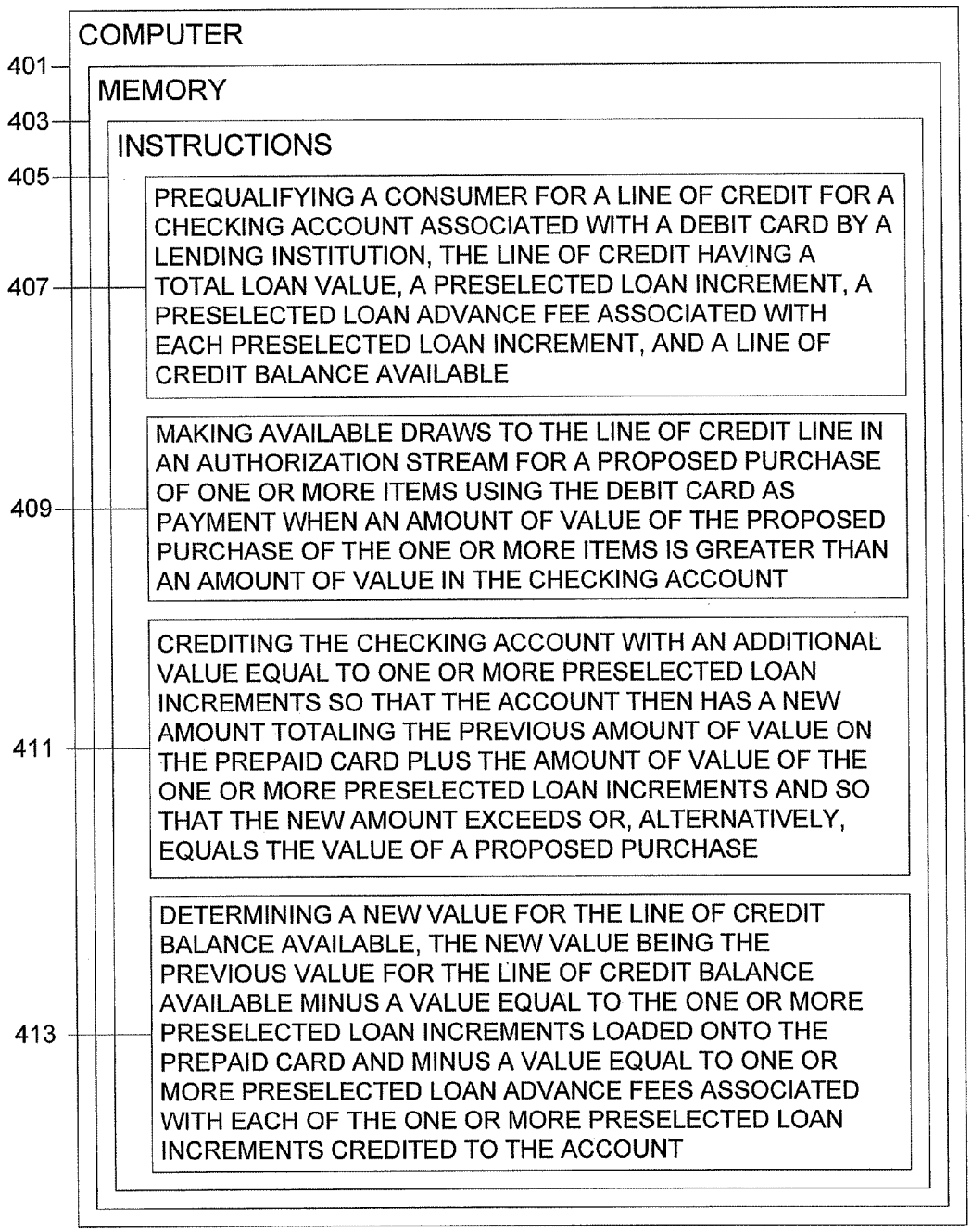
FIG. 4 is a partial schematic diagram of a computer program product according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

As illustrated in FIG. 1A, embodiments of the present invention include a method, e.g., a computerized method, of accessing a line of credit with a debit card 100. The method includes prequalifying a consumer for a line of credit for a checking account associated with a debit card by a lending institution 103 responsive to consumer underwriting data and predetermined qualification parameters to thereby convert consumer underwriting data into line of credit data. The line of credit has a total loan value, a preselected loan increment, a preselected loan advance fee associated with each preselected loan increment, and a line of credit balance available. The method also includes making available draws to the line of credit line in an authorization stream for a proposed purchase of one or more items using the debit card as payment when an amount of value of the proposed purchase of the one or more items is greater than an amount of value in the checking account 105. The proposed purchase data is received by the lending institution computer through the electronic communications network from a point of sale terminal associated with a merchant. The method further includes crediting the checking account with an additional value equal to one or more preselected loan increments so that the account then has a new amount totaling a previous amount of value in the account plus the amount of value of the one or more preselected loan increments and so that the new amount exceeds or, alternatively, equals the value of a proposed purchase 107 to thereby convert line of credit data into a value associated with the checking account to thereby fund the proposed payment. The method also includes determining a new value for the line of credit balance available, the new value being a previous value for the line of credit balance available minus a value equal to the one or more preselected loan increments credited to the checking account and minus a value equal to one or more preselected loan advance fees associated with each of the one or more preselected loan increments credited to the account 109.

As illustrated in FIG. 1B, embodiments of the present invention also provide, for example, a method of accessing a line of credit 150. The method includes a lending institution prequalifying a consumer for a line of credit for a checking account 153 responsive to consumer underwriting data and predetermined qualification parameters to thereby convert consumer underwriting data into line of credit data. Draws to the line of credit line are made available in an authorization stream for a proposed payment 155. The proposed payment can involve one or more of the following: a check, an electronic check, a debit card, an electronic bill payment, an automated teller machine (ATM) withdrawal, and a wire transfer. The proposed payment data can be, for example, received by the lending institution computer through the electronic communications network from a point of sale terminal associated with a merchant. The method also includes crediting the checking account with an additional value equal to one or more preselected loan increments so that the account then has a new amount totaling a previous amount of value in the account plus the amount of value of the one or more preselected loan increments and so that the new amount exceeds or, alternatively, equals the value of the proposed payment 157 to thereby convert line of credit data into a value associated with the checking account to thereby find the proposed payment. The method further includes determining a new value for the line of credit balance available 159. The new value is a previous value for the line of credit balance available minus the value credited to the account and minus fees, as each of the one or more preselected loan increments credited to the account generates a preselected loan advance fee. That is, embodiments of the method convert line of credit data into a value associated with a checking account so that the value associated with the checking account is exchanged for goods.

The flow of a consumer transaction according to an embodiment of the present invention, as illustrated in FIG. 2, can include, for example, determining the available balance of the checking account 203. If there is an insufficient balance in the checking account to complete the transaction, the available line of credit balance available is determined 205. If the checking account balance and line of credit balance available are sufficient to complete the transaction, the transaction is approved 207. Next, the checking account is credited in preselected loan increments so that the checking account never goes negative 209. Then a new line of credit balance is determined 211.

As understood by those skilled in the art, by prequalifying the consumer for the line of credit and making draws to the line of credit available in the authorization stream for a purchase using a debit card or other payment card as payment, embodiments of the present invention advantageously allow a consumer to avoid the planning and hassle associated with determining the amount of a loan prior to proposing a purchase. Previously, a consumer would have to determine the amount of the loan necessary to fund the proposed purchase, then secure the loan, and only then propose the purchase at a merchant using the debit card. If the information necessary to determine the amount of the loan exists only at the merchant, multiple trips to the merchant may be required. Under the embodiments of the present invention, however, multiple trips are not required as the amount of the loan is determined, up to the total loan value, in the authorization stream for a proposed purchase, e.g., using the debit card as payment, resulting in fewer rejections of proposed purchases, less embarrassment for consumers, and reduced cost due to fewer abandoned sales as understood by those skilled in the art. Advantageously, under the embodiments of the present invention, the consumer only pays for what is actually drawn.

According to other embodiments of the present invention, the amount of value of proposed purchase of the one or more items can include, for example, coupons, discounts, instant rebates, sales tax, or a combination thereof as understood by those skilled in the art.

According to other embodiments of the present invention, prequalifying a consumer for a line of credit for a checking account or other account, e.g., an account associated with a debit card or other spending device, can include, for example, the consumer opting in to a program with the lending institution using a written correspondence from the consumer, a consumer selection on a website, a telephone conversation with an interactive voice response unit (IVRU), a telephone conversation with a customer service representative, a mobile phone, or a combination thereof as understood by those skilled in the art. That is, embodiments of the present invention provide numerous flexible and convenient ways to initiate the prequalification process. When launched as an accessible website, for example, the website can provide various software based program product segments, as will be understood by those skilled in the art, from which bank products are accessible or downloadable. The website preferably includes secure site pages or portions, as understood by those skilled in the art, as financial and personal data on or for consumers may be provided by a consumer. As described herein, the website in an exemplary embodiment includes account management capabilities as understood by those skilled in the art to enhance qualification of consumers and tracking of consumer usage data or history. By including this feature, embodiments of other program products, methods, and systems can be enhanced and provided.

Embodiments of the present invention can provide, for example, that the lending institution comprises a first financial institution associated with the line of credit, and that the checking account is associated with a second financial institution so that a first financial institution can offer line of credit services for checking accounts associated with a second financial institution. In addition, embodiments of the present invention, for example, include the lending institution comprising a first lending institution and methods, operations, or instructions including associating the line of credit with a second checking account, or other account, at a second lending institution and decrementing a designated direct deposit from the second checking account, or other account, of the second lending institution for repayment of at least portions of the line of credit. That is, embodiments of the present invention provide for a debit card, or other payment card, to be associated with an account at one bank and the direct deposits used for repayment to be directed to an account at a different bank. These embodiments promote flexibility and enable lending institutions to partner with other lending institutions, when appropriate, to maximize account options and line of credit options for the consumer. Other embodiments include repayment through a file integration between the lending institution and institution that holds the checking accounts, rather than direct deposit rerouting, as understood by those skilled in the art.

A line of credit amount, for example, can be established responsive to direct deposit data and preselected underwriting formulas, as understood by those skilled in the art, that use the amount of direct deposits, among other factors, to determine the size of the credit line available. In an embodiment of the present invention involving prequalifying a consumer for a line of credit from a bank or other lending institution, the lending institution can require or define, for example, the following initial qualification parameters for a consumer: (1) consumer should provide employment and wage verification through a direct deposit history; (2) consumer should authorize bank initiated withdrawals from their account; and (3) consumer should have a history of at least one electronic deposit. In addition, the following on-going criteria, for example, should be met: (1) consumer's account should be in good standing, not overdrawn, cancelled, or in default of the customer agreement; and (2) consumer should continue to initiate electronic deposits to the account. The bank or lending institution, for example, may elect to make the account ineligible for a line of credit if an electronic deposit ceases. The bank can have a dedicated program manager qualify, approve, or authorize a consumer or can use program product stored in memory to make sure the criteria or parameters are satisfied or meet certain thresholds as selected by the bank or lending institution. The lending institution computer can prequalify a consumer responsive to underwriting data, including consumer underwriting data and initial qualification parameters, on-going criteria, consumer personal and financial data, and other factors as understood by those skilled in art.

Figure 5A:
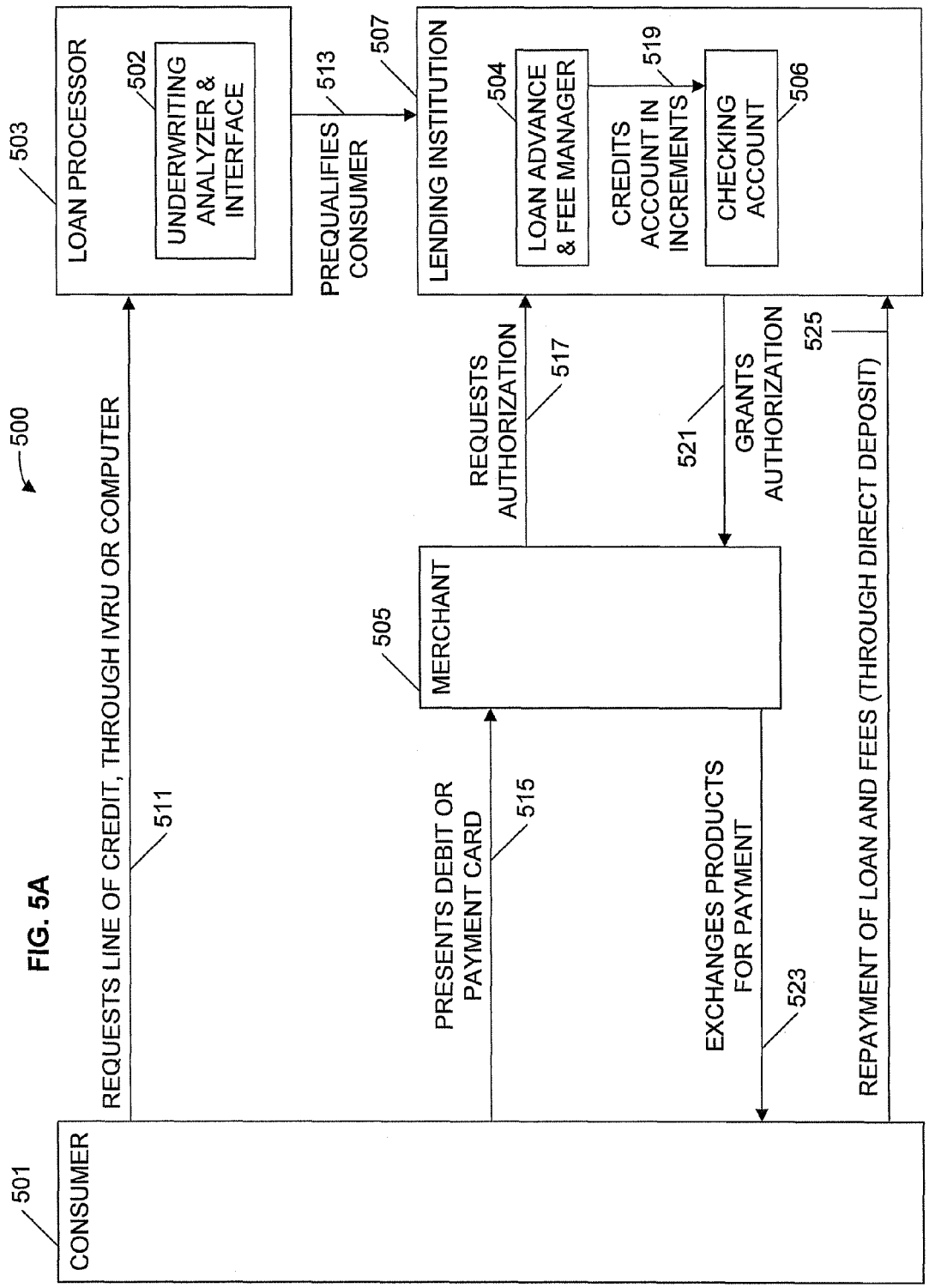
FIG. 5A is a schematic diagram of a line of credit flow according to embodiments of the present invention.

For example, as illustrated in FIG. 5A, a consumer 501 can request a line of credit through an IVRU or a computer 511 as part of a system 500. The consumer 501 can use the computer to register at a website using a program product according to embodiments of the present invention and launched from a server, e.g., at a loan processor, underwriting organization, bank, lending institution, other financial institution, payroll processing company, or other entity which can provide the line of credit product, among others, as will be understood by those skilled in the art. The form or qualification parameters can be consistent with one or more underwriting organizations or institutions or set/defined by the bank or lending institution. As understood by those skilled in the art, a loan, micro-loan, repayment line of credit, or other type of payment processor, such as provided by First Data Corporation, Total Systems Services, Inc., Fidelity National Information, Inc., or as custom developed by a bank, a financial institution, or other organization, operates to provide a customer interface on a line of credit or micro-loan request (see, e.g., access interface 600 of FIG. 6 in the form of a computer display having a graphical user interface) and determines and decides whether a potential or existing customer qualifies for a line of credit product. First Data Corporation, formerly First Data Resources, is a transaction processing company, including prepaid cards, and is headquartered in Greenwood Village, Colo., as understood by those skilled in the art. With headquarters located in Columbus, Ga., Total System Services, Inc. provides electronic payment services to financial institutions and companies, including consumer-finance, credit, debit, healthcare, loyalty, prepaid, chip and mobile payments, as understood by those skilled in the art. Headquartered in Jacksonville, Fla., Fidelity National Information, Inc. provides core processing for financial institutions, including card issuer, transaction processing, and outsourcing services to financial institutions and retailers, as understood by those skilled in the art. The line of credit or loan processor 321, 503 for example, can be outsourced by a lending institution, e.g., a bank, if desired, and numerous different loan processors (see, e.g., FIG. 5A with loan processor 503 having underwriting analyzer and interface software 502, for example) or entities that handle this function can be used as well (see also, e.g., FIG. 3 with computer server 321 handling the payment processor and interface access roles for consumer lines of credit 319, for example). When the loan processor prequalifies the consumer 513, the credentials can be passed to a lending institution computer 307, e.g., a computer associated with a bank or other financial institution 507 or other organization, and then a flag, code, notation, or other identifier can be associated with a consumer's profile in a database 309 so that when the consumer desires to access the line of credit, e.g., through a consumer purchase transaction using the debit card or payment card, the process acknowledges the identifier to then allow incremental micro-loans on the line of credit to be granted as described herein.

Once prequalified, for example, a consumer 501 can then present, for example, a debit or payment card for payment in transaction 515 with a merchant 505. The merchant 505, for example, can then request authorization 517 from the lending institution 507 associated with the debit or payment card. Within the authorization stream for the transaction, the lending institution 507 through a computer program product described herein, including a loan advance and fee manager 504, can credit the consumer account 506 in preselected loan increments from the line of credit 519. The lending institution 507 can then grant authorization for the payment 521. The merchant exchanges products, including goods and/or services, for payment 523. The consumer provides for the repayment of the loan and fees, typically through direct deposit 525 (see also, e.g., FIG. 7).

Figure 5B:
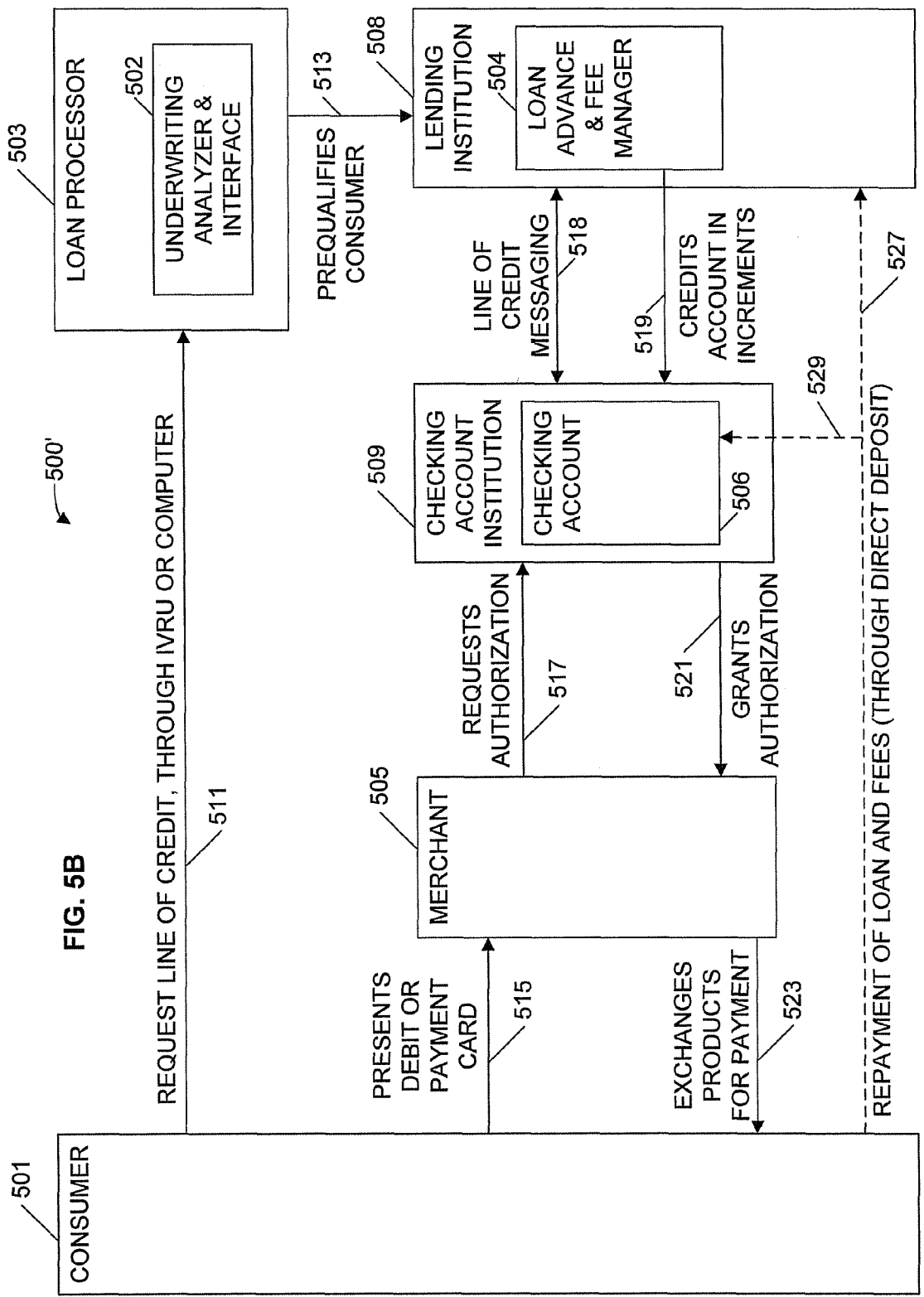
FIG. 5B is a schematic diagram of a line of credit flow according to other embodiments of the present invention.
Figure 9A:
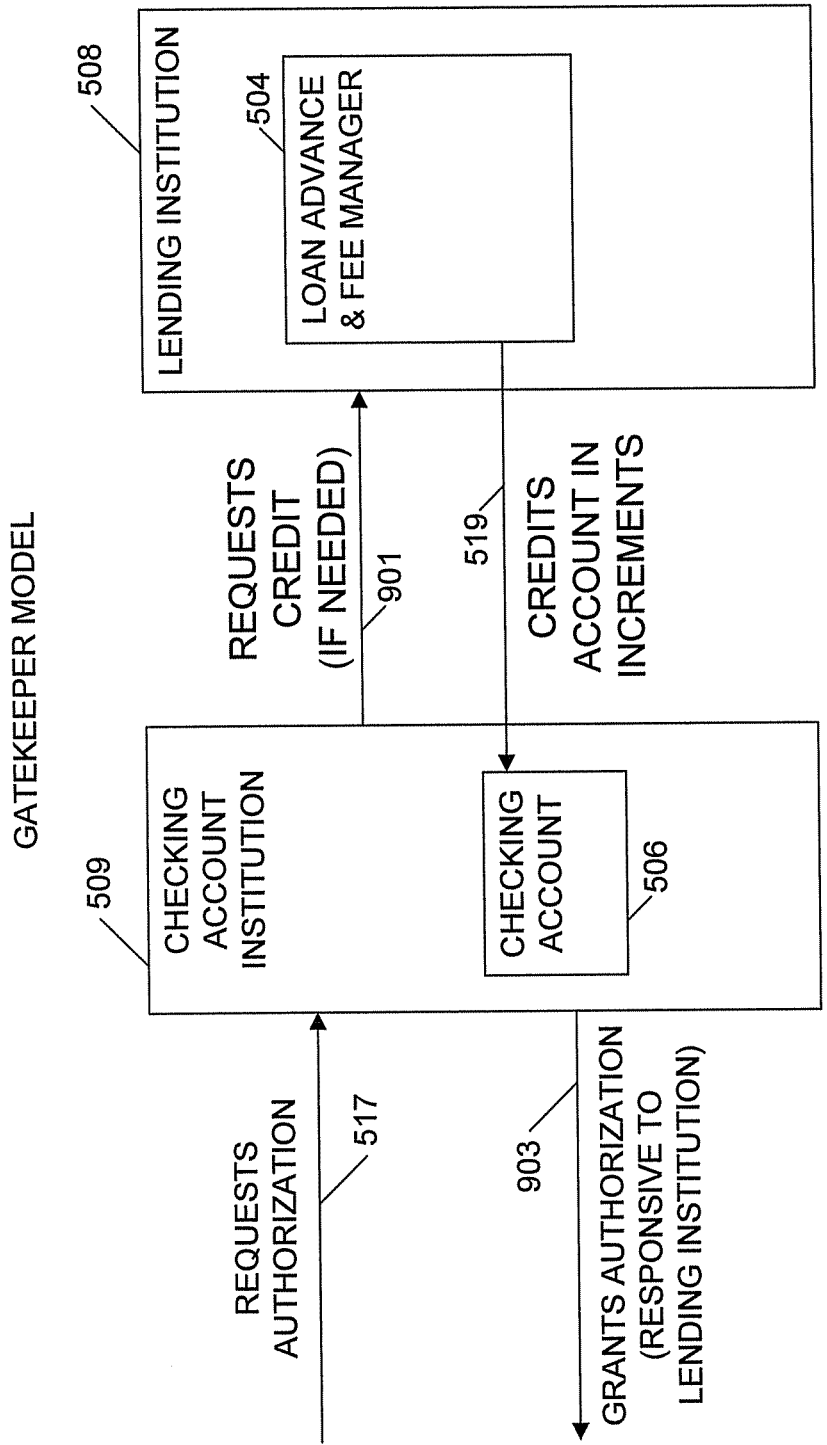
FIG. 9A is a schematic diagram of a gatekeeper model according to embodiments of the present invention.
Figure 9B:
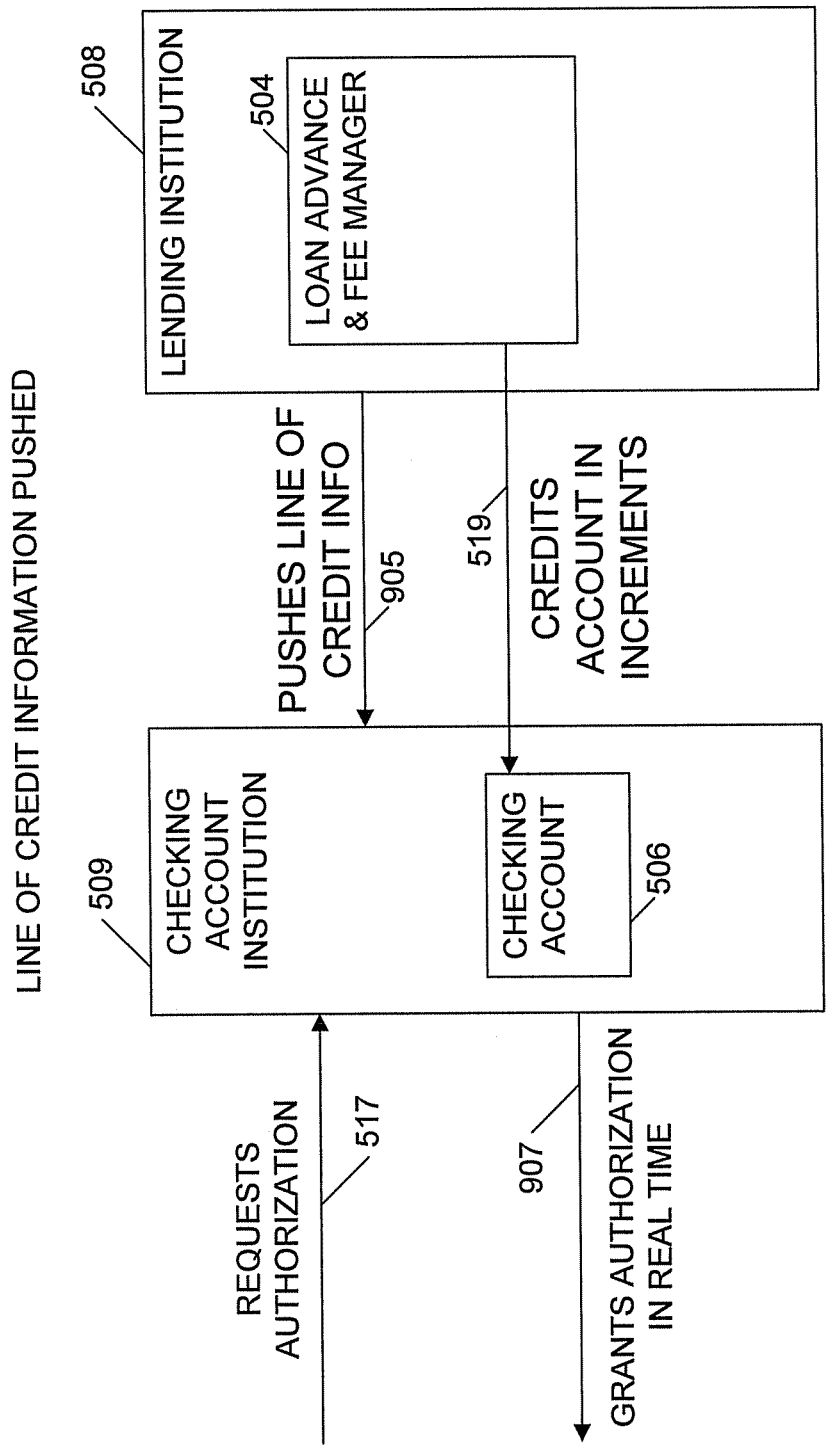
FIG. 9B is a schematic diagram of a model with pushed line of credit information according to embodiments of the present invention.
Figure 9C:
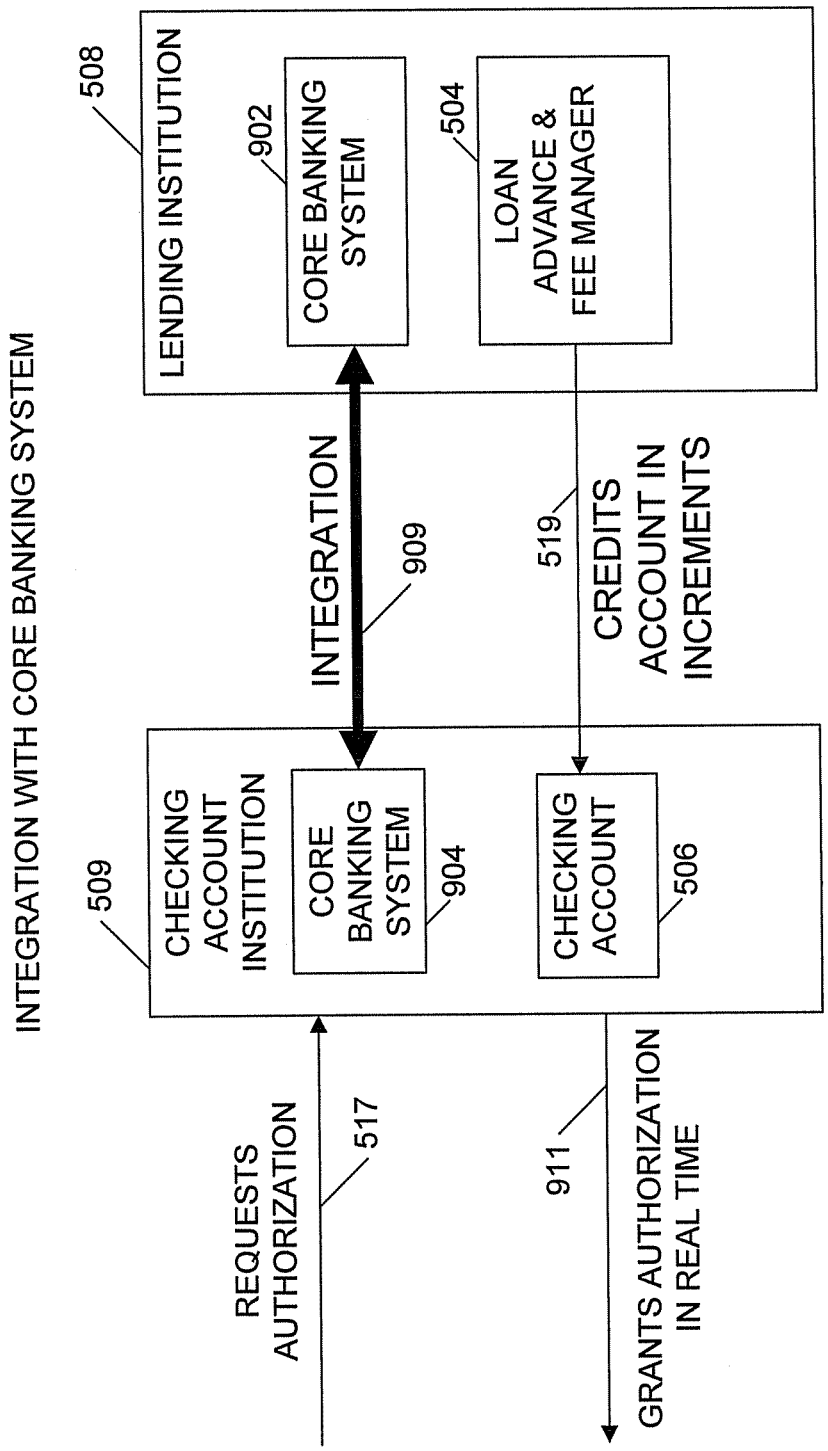
FIG. 9C is a schematic diagram of a core banking system integration according to embodiments of the present invention.

Embodiments of the present invention, for example, as illustrated in FIG. 5B, include a plurality of financial institutions interacting as understood by those skilled in the art. For example, a first financial institution, e.g., a lending institution 508, can offer lending services and provide the line of credit to the consumer, while a second financial institution 509 can provide the checking account 506 and associated services to the consumer. Embodiments of the present invention, for example, provide variations on the line of credit messaging 518 between the checking account institution 509 and the lending institution 508 as understood by those skilled in the art. In embodiments of a gateway model between the lending institution and checking account institution, for example, the checking account institution 509 notifies the lending institution 508 for a particular request for credit 517 as part of the line of credit messaging 518, allowing the lending institution to make the decision for the particular request so that the checking account institution can grant authorization of a request 521. As further illustrated in FIG. 9A, the checking account institution 509 receives the authorization request 517 and, if access to the line of credit is needed to complete the purchase or transaction, requests credit 901 from the lending institution 508. The checking account institution only then grants authorization responsive to the lending institution 903. In an alternate embodiment, as further illustrated in FIG. 9B, the lending institution 508 pushes line of credit information 905 to the checking account institution 509 (as part of the line of credit messaging 518 in FIG. 5B), allowing the checking account institution to make the decision to extend credit for a particular transaction responsive to the information from the lending institution so that the checking account institution can grant authorization of a request in real time 907. In another embodiment, as illustrated in FIG. 9C a file integration 909 of the core bank system of the lending institution 902 and the core banking system of the checking account institution 904 can allow the checking account institution 509 to make the decision to extend credit for a particular transaction responsive to the information from the lending institution so that the checking account institution can grant authorization of a request in real time 911. Core banking system refers to an integrated bank platform, including software and hardware, providing common banking functionality, including, for example, new account and transaction processing, document management and imaging, secure online banking, business intelligence, risk management, business analytics, and integrated workflow. Similarly, repayment of the line of credit and associated fees can be achieved through a file integration of the core bank system between the lending institution and the checking account institution, as shown in 529 and 518, or through the rerouting of direct deposits to the lending institution, as shown at 527. According to one embodiment of the present invention, part of a consumer request for a line of credit 511 involves the consumer agreeing to route direct deposits to the lending institution 508 and authorize loan and fee repayment from the direct deposits, as shown in 527. Surplus funds can be credited to the consumer's checking account 506 immediately thereafter. Alternately, direct deposit funds can continue to be directed to the consumer's checking account 506, as shown in 529. Through such embodiments, a lending financial institution can provide services to another, e.g., non-lending, financial institution as a replacement for its overdraft product by connecting to the core bank system of the institutions.

The following example illustrates an embodiment of the present invention. See also FIG. 11. A consumer initiates engagement through a phone call with a customer service representative and receives approval by the lending institution for a line of credit for a checking account associated with a debit card with preselected loan increments of $20 with a $2.50 fee per increment. The consumer proposes to purchase items with a value of $42, but only has an account balance of $21. The consumer, however, also has $60 available on the line of credit, with an outstanding balance of $0. When the consumer proposes the purchase, the amount of value of the proposed purchase is determined to be $42 (as this example assumes no coupons, discounts, instant rebates, or sales tax for illustrative purposes). The amount of value in the account is determined to be $21. Then the difference is determined to be $21. Next, two (2) preselected increments of $20 each, for a total value of $40, are credited to the checking account so that the account then has a new amount, in this example $61, totaling the amount previously in the account ($21) plus the one or more preselected loan increments (2×$20 $40) and so that the new amount exceeds or, alternatively, equals the value of the proposed purchase ($61>$42). The purchase is transacted, and the account balance after the purchase is $19 ($61−$42=$19). The loan fee is determined to be $5 (2×$2.50=$5). The line of credit balance outstanding is now $45, which is calculated as the previous balance ($0) plus the value of the preselected increments credited to the account ($40) and the value of the loan fee ($5). Therefore, there remains $15 available on the line of credit ($60-2×$20−2× $2.50 $15).

In other embodiments of the present invention, the lending institution can make available only a part of the preauthorized total loan value available for crediting to the account, responsive to a consumer determination, so that the consumer retains maximum control. For example, the consumer determines to make available only $75 of the preauthorized total loan value, of say $200. The amount of value of the proposed purchase is determined to be $98; the amount of value in the account is determined to be $20; and the difference is determined to be $78. Because the difference is greater than the amount available for crediting to the account, authorization for the proposed purchase is denied, and the proposed purchase is rejected. Alternatively, the lending institution can establish a limit for the draw that is lower than the overall balance available.

As understood by those skilled in the art, by crediting the consumer's account only in preselected loan increments, embodiments of the present invention advantageously can guarantee a fee structure that is proportional to the amount of credit accessed. By comparison, an overdraft fee charge by a bank for "bounced" check is often by larger than the overdraft amount. Instead, the fee structure according to embodiments of the present invention more closely resembles an automated teller machine (ATM) fee. In addition, the use of preselected loan increments can often result in value remaining in the account, allowing for small transactions without generating additional loan fees. For example, after of a credit of a preselected loan increment of $50 and subsequent purchase transaction, the balance in the account ranges from $0.00 to $49.99.

According to another embodiment of the present invention, the financial institution can be a federally-chartered bank subject to federal banking laws and regulations and not subject to state banking laws and regulations. Therefore, the federally-chartered financial institution enjoys rate preemption; that is, state licensing requirements, as well as regulations in many states that limit lending interest rates, are preempted and do not apply to the federally-chartered financial institution. As understood by those skilled in the art, a federally-chartered financial institution can operate in every state with a consistent implementation nationally rather than a state-by-state approach, can provide the line of credit as a bank product so that the line of credit complies with federal Regulation Z, and can charge any loan or interest rate without regard to state law.

According to another embodiment of the present invention, the lending institution can adjust the preauthorized total loan value and repayment terms based on the performance of the consumer. That is, a consumer with good repayment history can typically earn access to a larger line of credit. See also FIG. 11.

As illustrated in FIG. 3, embodiments of the present invention include a system of advancing one or more preselected loan increments to a checking account, e.g., a checking or other consumer account associated with a debit card. The system 300 includes a first computer associated with a lending institution defining a lending institution computer 307. The lending institution computer 307 can include, for example, input-output I/O devices 306A; one or more processors 306B; memory 306C, such as, computer readable media; and a display 306D. The memory 306C of the lending institution computer 307 can include a computer program product 400 as described herein and can include, for example, one or more databases containing account data files 309. The lending institution computer 307 is positioned to manage a line of credit associated with a checking account or other consumer account, i.e., to control access to funds from a line of credit associated with the account. The system 300 also includes a plurality of second computers associated with a plurality of merchants 317 defining a plurality of merchant computers 313. Each merchant computer 313 can include, for example, input-output I/O devices 314A; one or more processors 314B; and memory 314C, such as, computer readable media. Each merchant computer 313 is positioned to determine an amount of value of a proposed purchase of one or more items. The system 300 further includes a plurality of point-of-sale terminals 315, each associated with one or more of merchant computers 313 and in communication, through an electronic communications network 311, with the lending institution computer 307. Each point-of-sale terminal 315 has a processor defining an acquiring processor and can be in communication with a merchant computer 313. Debit card data can be read by swiping the card through a slot 310C past a reading head of a point-of-sale terminal 315. The point-of-sale terminal 315 can also include a display 310A and input/output (I/O) devices 310B, e.g., a keypad. The system 300 further includes a computer program product associated with the lending institution computer 307, stored on a tangible computer readable memory media, and operable on a computer, the computer program product comprising a set of instructions that, when executed by the computer, cause the computer to perform various operations as discussed herein.

In other embodiments of the present invention, the system can include, for example, a plurality of consumer access interface devices 301, e.g., computers, each having memory 304C, to communicate through an electronic communications network 311 with the lending institution computer 307 and, for example, a line of credit loan processor 321, to initiate the prequalification process. Each customer computer 301 can include, for example, input-output I/O devices 304A;

one or more processors 304B; memory 304C, such as, computer readable media; and a display 304D. The memory 304C of the customer computer 301 can include an Internet browser 304E, a computer application used for accessing sites or information on a network, as understood by those skilled in the art.

As illustrated in FIG. 4, embodiments of the present invention include a computer program product 400 associated with the lending institution computer 401, stored on a tangible computer readable memory media 403, and operable on a computer, the computer program product 400 comprising a set of instructions 405 that, when executed by the computer, cause the computer to perform various operations. The operations include prequalifying a consumer for a line of credit for a checking account, e.g., a checking account associated with a debit card, by the lending institution 407 responsive to consumer underwriting data and predetermined qualification parameters to thereby convert consumer underwriting data into line of credit data. The line of credit has a total loan value, a preselected loan increment, a preselected loan advance fee associated with each preselected loan increment, and a line of credit balance available. The operations also include making available draws to the line of credit line in an authorization stream for a proposed purchase of one or more items using the debit card as payment when an amount of value of the proposed purchase of the one or more items is greater than an amount of value in the checking account 409. The proposed purchase, for example, can be received by the lending institution computer through the electronic communications network from a point of sale terminal associated with a merchant. The operations further include crediting the checking account with an additional value equal to one or more preselected loan increments so that the account then has a new amount totaling a previous amount of value in the account plus the amount of value of the one or more preselected loan increments and so that the new amount exceeds or, alternatively, equals the value of a proposed purchase 411 to thereby convert line of credit data into a value associated with the checking account to thereby fund the proposed payment. The operations also include determining a new value for the line of credit balance available, in which the new value is a previous value for the line of credit balance available minus a value equal to the one or more preselected loan increments credited to the checking account and minus a value equal to one or more preselected loan advance fees associated with each of the one or more preselected loan increments credited to the account 413.

In other embodiments of the present invention, rather than crediting the consumer account in preselected loan increments with each increment associated with a preselected loan advance fee, the account can be credited with a draw for an exact amount of purchase at a defined rate. In such embodiment, a standard consumer draw on the line of credit could be in $40 increments, but when an auto-draw is initiated by a purchase at a point of sale or an automated teller machine (ATM) withdrawal, the exact amount of funds needed to be borrowed will be advanced. As a result, for example, the fee amount assessed for a $40 draw might be $5.00, while if the amount borrowed on an auto-draw is only $20 the fee would be assessed ratably and would be $2.50 for the borrowing.

Embodiments of the present invention can, for example, include repayment of at least portions of the line of credit responsive to a subsequent direct deposit received for the consumer's benefit by the bank so that the repayment of the at least portions of the line of credit is deducted from the subsequent direct deposit. That is, loans made under a line of credit can be repaid out of the proceeds of a direct deposit. Recurring direct deposits include, for example, employer payroll funds, federal or state government electronic benefits payments, annuities, dividends, interest payments, lottery winnings, royalty payments, and other streams of payments as understood by one skilled in the art.

Embodiments of systems, program products, and methods of the present invention can include, for example, for substantially all programs if desired, features such as any repayment of draws on the line of credit can be automatically collected from the next electronic deposit regardless of payment source. As payments are received, fees also can be paid first then the payment applied to the oldest outstanding draw amount. When payments are received, total available line limit is restored by the payment amount. If funds from the electronic deposit are not sufficient to cover the outstanding balance, a partial repayment can be made in the full amount of the electronic deposit resulting in an unpaid balance in the account. Repayment of the remaining unpaid balance can be taken from subsequent electronic deposits until the line has been paid in full. Other cash equivalent repayment options also can be accepted and processed by a line of credit processor as understood by those skilled in the art.

Figure 7:
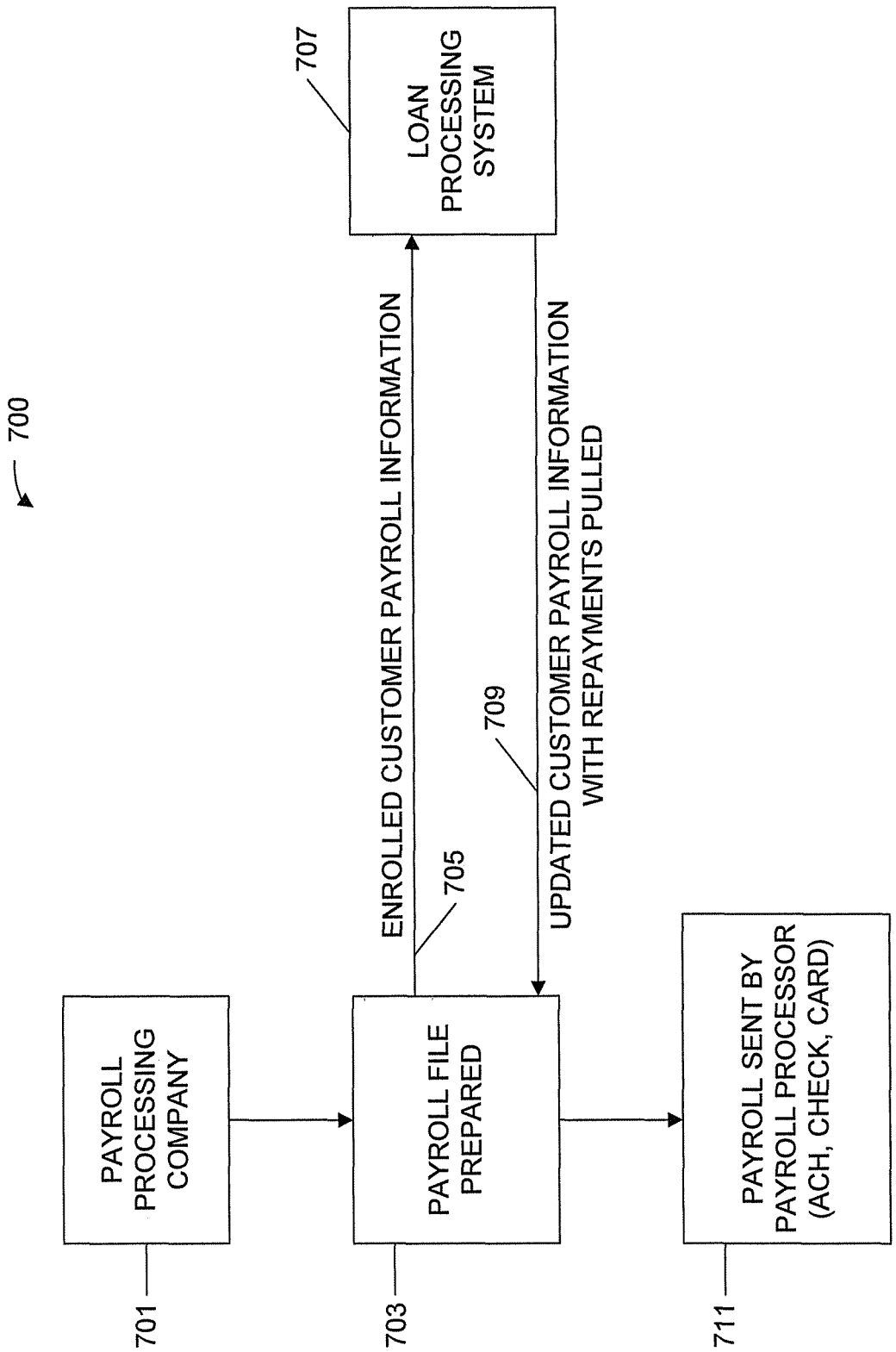
FIG. 7 is a schematic diagram of a payroll processor system according to an embodiment of the present invention.

It will also be understood by those skilled in the art that embodiments of the line of credit product or program product, for example, can be associated with a payroll processing company that processes direct deposits (see, e.g., FIG. 7). Embodiments of the program product and methods can be added to product or service offerings by the payroll processing company 701 so that it can be offered to their customers independent of bank by taking money or funds out at the source, e.g., as the payroll file is prepared 703 and before the direct deposit is even originated, or credited to the checking account, for example. These embodiments can also allow the processing company 701 to have more direct information on employment history. A payroll processing company 701 can also use a loan processing system 707, loan processor, or other payment processor either within their facilities or as an outsourcing entity to allow the provision of enrolling and providing consumer payroll information 705 and for tracking and reconciling repayment or updated consumer payroll information with repayments pulled 709. The payroll can be sent, loaded or processed by a payroll processor 711 for ACH transmittal, check generation, or account transfer, for example (see, e.g., FIG. 7). These embodiments of the present invention, for example, can include loan repayment occurring from direct deposit funds prior to or relatively instantaneously with the direct deposit funds being made available in the consumer's account. An example of and more details on how repayment can be accomplished is illustrated in U.S. Provisional Patent Application Ser. No. 61/016,213 titled "Transfer Account Systems, Computer Program Products, and Associated Methods" filed on Dec. 21, 2007 which is incorporated herein by reference in its entirety.

Additionally, along these lines, any repayment of a line supersedes repayment of a negative balance for an account due to settlement transactions that cause the account to go negative. Any monies remaining after a payment is received can be credited to the account. If payment takes the account balance to $0, any transactions attempted with the debit card, or other payment card, can be declined. Those transactions can be subject to any related decline fees. Repayment of a draw, for example, should not generally be taken from funds in an account. That is, if an account balance is positive prior to a draw, only when the next electronic deposit is initiated to the account will repayment be triggered. If a draw is not paid within the preselected time period, preferably days, e.g., 35 day timeframe, any amount owed can be taken from the principal balance in the consumer's account.

Figure 8:
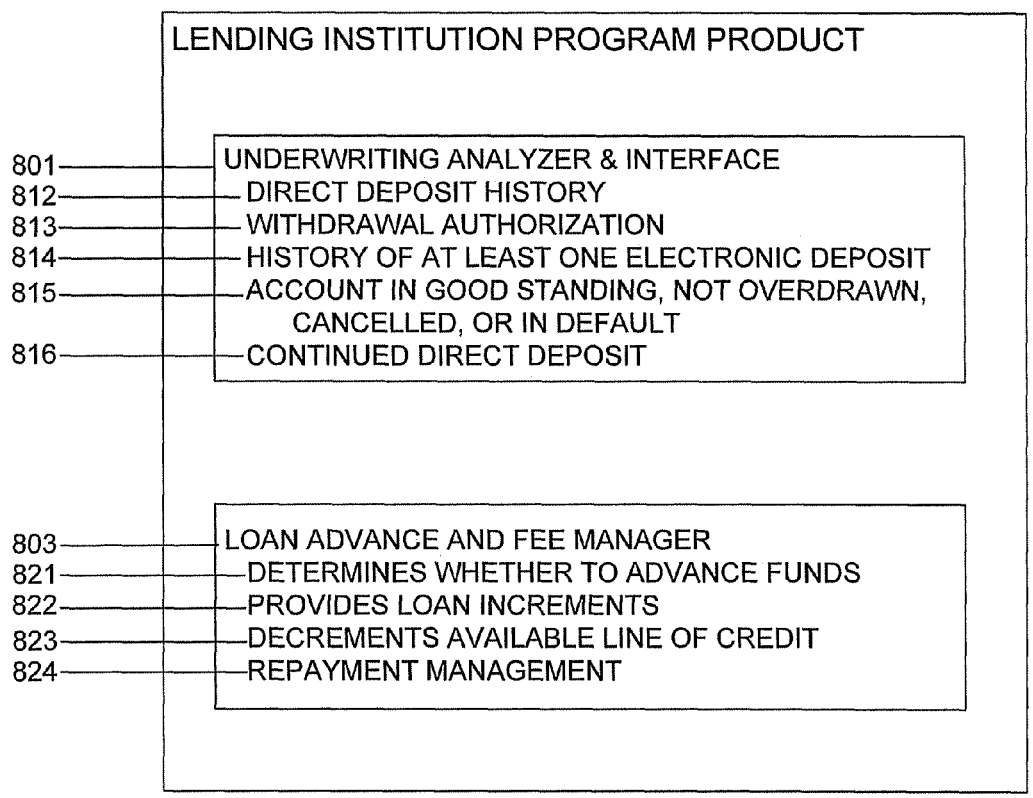
FIG. 8 is a schematic diagram of a program product according to an embodiment of the present invention.

Embodiments of the present invention provide, for example, a program product 800 associated with a bank or other financial or lending institution implemented in modules or components, as illustrated in FIG. 8. An underwriting analyzer and interface component 801 of a lending institution program product 800 can receive underwriting information, e.g., data, and make the determination whether to offer a line of credit or other product to the consumer as understood by those skilled in the art. That is, an underwriting analyzer and interface component 801 can respond to a consumer initiated engagement and can determine whether to prequalify the consumer for a line of credit to thereby convert underwriting data into line of credit data. Underwriting data can include a direct deposit history 812; a withdrawal authorization or approval 813, from an enrollment in a line of credit program; a history of at least one electronic deposit 814; an account being in good standing, not overdrawn, cancelled, or in default 815; continued direct deposit 816; and other data as understood by those skilled in the art. In addition, a loan advance and fee manager module 803 deals with determining whether to advance funds 821, providing loans in preselected increments 822, calculating available credit 823, managing repayments 824, and other associated tasks as understood by those skilled in the art. Other architectures and organizations will be understood by those skilled in the art to be included within the embodiments of the present invention. Program products can be implemented in a variety of software and programming languages, including without limitation hypertext markup language ("HTML"), Java, C, C++, XML, and others as understood by those skilled in the art.

Figures 10A, 10B:
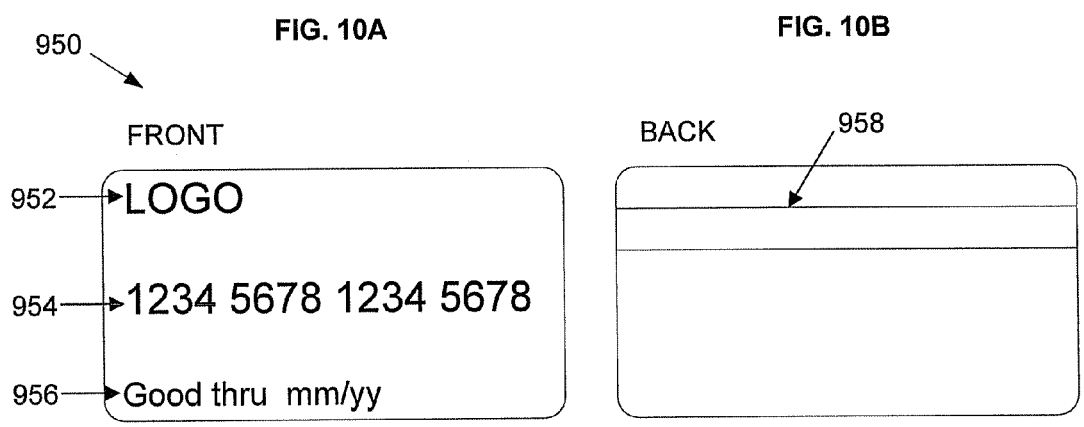
FIGS. 10A and 10B are respective front and back plan views of a prepaid card according to an embodiment of the present invention.

As illustrated in FIGS. 10A, 10B, and 3, embodiments of the present invention can include, for example, a debit card 950, or payment card, or check card, or other account access card, and a point-of-sale terminal device 315, e.g., a card reader. As understood by those skilled in the art, a payment card, e.g., a debit card, can have indicia 952, e.g., logos, slogans, source identifiers, of a sponsoring bank and of a prepaid card processor; a serial number 954; and expiration date 956. The structures of various types of specific cards, e.g., magnetic stripe 958, type of material, are well known to those skilled in the art and can be used with embodiments of the present invention. Typically, a card 950 is formed from plastic and has a magnetic stripe 958 affixed to the plastic through an application of heat. Those skilled in the art will understand that other embodiments besides a magnetic stripe can include radio frequency identification devices (RFID), smart chips, bar codes, and other similar devices. Embodiments of the present invention can include forming cards or receiving cards already formed. The magnetic stripe card 950 can store information, or data, e.g., account information, by modifying the magnetism of particles on the magnetic stripe 958 on the card. The information can be read by swiping the card through a slot 310C past a reading head of a card reader device 315, e.g., point-of-sale hardware. The point-of-sale terminal 315 can include a display 310A and input/output (I/O) devices 310B, e.g., a keypad. Typically, there are two tracks of information on a magnetic card 950 used for financial transactions, known as tracks 1 and 2. In addition, a third track, known as track 3, can be available for magnetic stripe cards. Tracks 1 and 3, if available, are typically recorded at 210 bits per inch, while track 2 typically has a recording density of 75 bits per inch. Track 2, as typically encoded, was developed by the American Bankers Association (ABA) provides for 37 numeric data characters, including up to 19 digits for a primary account number (including a Bank Identification Number as understood by those skilled in the art), an expiration date, a service code, and discretionary verification data, such as, a Personal Identification Number, or PIN. The information, e.g., data, on the card can be used, for example, to facilitate a transaction, For example, when the card 950 is swiped through a slot 310C, the data on the magnetic stripe 958 is read and processed by the point-of-sale terminal 315, converting data stored in the magnetic particles on the card into data associated with readers 315 and a lending institution computer 307. The point-of-sale terminal 315 can then communicate through an electronic communications network 311 to, for example, a lending institution computer 307. The point-of-sale terminal 315, e.g., card reader, communicates the account information, e.g., data, as read from the card, as well as other data, such as, an amount of a proposed transaction for approval from the merchant computer 313. The other data, for example, can be entered by merchant personnel (e.g., an amount of the transaction), the consumer (e.g., a PIN, or security code), or bank personnel (e.g., a security approval). The lending institution computer 307 can then utilize the account information and other data to authorize or reject a purchase by, for example, determining whether a proposed purchase by the consumer is less than an amount of funds remaining on the card. Moreover, optional security measures, including, for example, a mismatch between a PIN supplied by the consumer and a PIN stored on the card 950 or in a database 309, can result in the rejection of a proposed transaction. The lending institution computer 307 then perform certain functions, including responding to the authorization request so that a point-of-sale displays an indication of approval or rejection, resulting in a visual depiction to a merchant of the approval or rejection of the proposed transaction. Also, the lending institution computer 307 can, for example, write data to a database 309 to record a purchase or other transaction (including advancing a loan from the line of credit), to debit available funds from an account associated with the card 950, and to credit directly or indirectly a merchant for a purchase. In addition to purchase authorization, embodiments of the present invention also can include customer inquiries into recent transactions or a balance inquiry, i.e., an amount of remaining value associated with the checking account.

As illustrated in FIG. 11, embodiments of the present invention include, for example, providing data associated with a checking account or debit card as a visual representation of account activity. Embodiments include displaying an account activity statement, including a purchase, on a display device to thereby provide a visual representation of a value associated with the checking account being exchanged for goods. For example, a customer computer 301, through an Internet Browser 304E, (see FIG. 3) can display on a display 304D an account activity statement 612 for a customer-specific account 613, or set of accounts, with each transaction including, for example, a date 614A, a description 614B, a amount credited to the account 614C, an amount debited from the account 614D, a resulting balance 614E, a line of credit amount available 614F, and a line of credit outstanding balance 614G, or other such data as understood by those skilled in the art. For example, the visual representation can include a balance inquiry 615A. For example, the visual representation can include crediting the checking account with an additional value equal to one or more preselected loan increments so that the account then has a new amount totaling a previous amount of value in the account plus the amount of value of the one or more preselected loan increments and so that the new amount exceeds or, alternatively, equals the value of the proposed payment 615B. For example, the visual representation can include a purchase of goods 615C, wherein data associated with a debit card representing an amount of value in a checking account is modified in an exchange for products, including goods or services. In addition, the visual representation can include a direct deposit 615D and also a loan repayment from direct deposit funds relatively instantaneously (or prior to) with the direct deposit funds being made available in the consumer's account 615E. In other embodiments, crediting the checking account with an additional value 615B and an associated purchase of goods 615C can be represented as a single transaction; likewise, the direct deposit 615D and an associated loan repayment 615E can be represented as a single transaction. In addition, the visual representation can include an increase in a total loan value 615F, i.e., an amount available from the line of credit, responsive to consumer performance data.

A person having ordinary skill in the art will recognize that various types of memory are readable by a computer such as described herein, e.g., lending institution, line of credit processors, payroll processor, or other computers with embodiments of the present invention. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links. For example, such media can include operating instructions, as well as instructions related to the system and the method steps described above and can operate on a computer. It will be understood by those skilled in the art that such media can be at other locations instead of or in addition to the lending institution computer to store program products, e.g., including software, thereon.

This application claims priority to and the benefit of: U.S. Provisional Patent Application Ser. No. 61/042,612, by Ahlers et al., titled "System, Program Product, and Methods to AutoDraw for Micro-Credit Attached to a Prepaid Card" filed Apr. 4, 2008; U.S. Provisional Patent Application Ser. No. 61/042,624, by Crowe et al., titled "System, Program Product, and Method to Authorize Draw for Retailer Optimization" filed on Apr. 4, 2008; and U.S. Provisional Patent Application Ser. No. 61/082,863, by Ahlers et al., titled "System, Program Product, and Method for Debit Card and Checking Account AutoDraw" filed on Jul. 23, 2008, all of which are each incorporated herein by reference in their entireties. This application also relates to: U.S. Provisional Patent Application Ser. No. 61/016,213, by Sorbe et al., titled "Transfer Account Systems, Computer Program Products, and Associated Methods" filed on Dec. 21, 2007; U.S. Provisional Patent Application Ser. No. 61/052,454, by Sorbe et al., titled "Transfer Account Systems, Computer Program Products, and Methods to Prioritize Payments from Preselected Bank Account" filed May 12, 2008; U.S. Provisional Patent Application Ser. No. 61/029,975, by Sorbe et al., titled "Methods To Advance Loan Proceeds On Prepaid Cards, Associated Systems and Computer Program Products" filed on Feb. 20, 2008; U.S. Provisional Patent Application Ser. No. 61/042,612, by Ahlers et al., titled "System, Program Product, and Associated Methods to Authorize Draw for Micro-Credit Attached to a Prepaid Card" filed on Apr. 4, 2008; U.S. Provisional Patent Application Ser. No. 61/032,750, by Ahlers et al., titled "Methods, Program Product, and System for Micro-Loan Management" filed on Feb. 29, 2008; U.S. Provisional Patent Application Ser. No. 61/060,559, by Galit et al., titled "Methods, Program Product, and System to Enhance Banking Terms Over Time" filed on Jun. 11, 2008; U.S. Provisional Patent Application Ser. No. 61/082,863, by Ahlers et al., titled "System, Program Product, and Method For Debit Card and Checking Account Autodraw" filed on Jul. 23, 2008; U.S. Provisional Patent Application Ser. No. 61/053,056, by Galit et al., titled "System, Program Product, and Method For Loading a Loan On a Pre-Paid Card" filed on May 14, 2008, all of which are each incorporated herein by reference in their entireties. This application also relates to: U.S. patent application Ser. No. 12/338,365, by Sorbe et al., titled "Transfer Account Systems, Computer Program Products, and Associated Computer-Implemented Methods" filed on Dec. 18, 2008; U.S. patent application Ser. No. 12/338,402, by Sorbe et al., titled "Transfer Account Systems, Computer Program Products, and Associated Computer-Implemented Methods" filed on Dec. 18, 2008; U.S. patent application Ser. No. 12/338,440, by Sorbe et al., titled "Transfer Account Systems, Computer Program Products, and Associated Computer-Implemented Methods" filed on Dec. 18, 2008; U.S. patent application Ser. No. 12/338,584, by Sorbe et al., titled "Transfer Account Systems, Computer Program Products, and Computer-Implemented Methods to Prioritize Payments from Preselected Bank Account" filed Dec. 18, 2008; U.S. patent application Ser. No. 12/338,645, by Sorbe et al., titled "Transfer Account Systems, Computer Program Products, and Computer-Implemented Methods to Prioritize Payments from Preselected Bank Account" filed Dec. 18, 2008; U.S. patent application Ser. No. 12/389,749, by Sorbe et al., titled "Methods to Advance Loan Proceeds on Prepaid Cards, Associated Systems and Computer Program Products" filed on Feb. 20, 2009; PCT/US09/34692, by Sorbe et al., titled "Methods to Advance Loan Proceeds on Prepaid Cards, Associated Systems and Computer Program Products" filed on Feb. 20, 2009; U.S. patent application Ser. No. 12/417,199, by Ahlers et al., titled "System, Program Product, and Associated Methods to Authorize Draw for Micro-Credit Attached to a Prepaid Card" filed on the same day herewith; U.S. patent application Ser. No. 12/417,211, by Ahlers et al., titled "System, Program Product, and Associated Methods to Authorize Draw for Micro-Credit Attached to a Prepaid Card" filed on the same day herewith; U.S. patent application Ser. No. 12/417,182, by Crowe et al., titled "System, Program Product, and Method to Authorize Draw for Retailer Optimization" filed on the same day herewith; U.S. patent application Ser. No. 12/338,684, by Ahlers et al., titled "Computer-Implemented Methods, Program Product, and System for Micro-Loan Management" filed on Dec. 18, 2008; PCT/US08/87660 by Ahlers et al., titled "Computer-Implemented Methods, Program Product, and System for Micro-Loan Management" filed on Dec. 19, 2008; U.S. patent application Ser. No. 12/338,712, by Galit et al., titled "Computer-Implemented Methods, Program Product, and System to Enhance Banking Terms Over Time" filed on Dec. 18, 2008; and PCT/US08/87689 by Galit et al., titled "Computer-Implemented Methods, Program Product, and System to Enhance Banking Terms Over Time" filed on Dec. 19, 2008, all of which are each incorporated herein by reference in their entireties.

Many modifications and other embodiments of the invention will come to the mind of one skilled in the art having the benefit of the teachings presented in the foregoing descriptions and the associated drawings. Therefore, it is to be understood that the invention is not to be limited to the illustrated embodiments disclosed, and that modifications and other embodiments are intended to be included within the scope of the appended claims.

That claimed is:

1. Non-transitory computer memory encoded with computer program and operable on a computer to allow a debit card user to access a line of credit associated with one or more of a plurality of checking accounts when using a debit card, the computer program comprising:

a first computer program to extend a line of credit associated with one or more of a plurality of checking accounts defining an incremental line of credit qualifying module, the incremental line of credit qualifying module comprising the instructions of:

prequalifying, by a computer associated with a lending institution thereby defining a lending institution computer, a debit card user for a line of credit to be associated with one or more of a plurality of checking accounts responsive to consumer underwriting data and predetermined qualification parameters, and establishing the line of credit associated with one or more of the plurality of the checking accounts responsive to approval of the line of credit, the line of credit having a total credit limit and adapted to be drawn in at least one of a plurality of separate predetermined loan increments each being equal in value and less than the total credit limit, and a second computer program to allow one or more draws to the line of credit in one or more of the plurality of separate predetermined loan increments when using a debit card, the second computer program defining an incremental line of credit dispensing module and comprising the instructions of:

determining, by the lending institution computer responsive to receipt of transaction data, when a debit card associated with the one or more of the plurality of the checking accounts is being used as payment for a proposed purchase and when a value of the proposed purchase is greater than a value associated with the one or more of the plurality of checking accounts, determining, by the lending institution computer, responsive to the value of the proposed purchase being greater than the value associated with the one or more of the plurality of the checking accounts, a number of separate predetermined loan increments to be added to the value associated with the one or more of the plurality of checking accounts so that the number of separate predetermined loan increments multiplied by the value of one of the plurality of separate predetermined loan increments and plus the value associated with the one or more of the plurality of checking accounts exceeds the value of the proposed purchase by less than the value of one of the plurality of separate predetermined loan increments, loading, by the lending institution computer, the one or more of the plurality of checking accounts with one or more of the plurality of separate predetermined loan increments that corresponds with the number of separate predetermined loan increments to thereby define one or more loaded predetermined increments when the one or more of the loaded predetermined increments and a total value of a predetermined loan advance fee corresponding thereto collectively do not exceed a line of credit balance available, the total value of the predetermined loan advance fee being equal to the value of one of the plurality of separate predetermined loan increments multiplied by the number of separate predetermined loan increments, determining, by the lending institution computer, a new value of the line of credit balance available, the new value being a previous value of the line of credit balance available minus the one or more loaded predetermined increments to the one or more of the plurality of checking accounts and minus the total value of the predetermined loan advance fee, and determining, by the lending institution computer, a new value of a line of credit balance, the new value being a previous value of the line of credit balance plus the one or more loaded predetermined increments loaded to the one or more of the plurality of checking accounts plus the total value of the predetermined loan advance fee, the total value of the predetermined loan advance fee being less than the loaded predetermined increments loaded to the one or more of the plurality of checking accounts.

2. Non-transitory computer memory as defined in claim 1, wherein the computer program further comprising:

a third computer program to repay the loaded predetermined increment defining an incremental line of credit repayment module, the incremental line of credit repayment module comprising the instruction of:

repaying, by the lending institution computer, at least a first portion of the new value of the line of credit balance responsive to at least one of a plurality of automatic deposits being available to the lending institution computer and prior to being made available to the debit card user, the difference between the new value of the line of credit balance minus the first portion of the new value of line of credit balance repaid thereby defining an unpaid balance.

3. Non-transitory computer memory as defined in claim 2, wherein the first portion of the new value of line of credit balance repaid includes at least the total value of the predetermined loan advance fee, wherein the value of the proposed purchase includes adjustments for one or more of the following: coupons, discounts, instant rebates, and sales tax, wherein the lending institution is a federally-chartered bank subject to federal banking laws and regulations and not subject to state banking laws and regulations, and wherein the line of credit is bank product so that the line of credit complies with federal Regulation Z.

4. Non-transitory computer memory as defined in claim 1, wherein the line of credit is one of a plurality of line of credits associated with the lending institution computer, and wherein the one or more of the plurality of checking accounts are associated with one or more of a plurality of financial institutions and one or more of a plurality of financial institution computers positioned remote from the lending institution computer.

5. Non-transitory computer memory as defined in claim 4, wherein a core banking system of the lending institution is integrated with a core banking system of one or more of the plurality of financial institutions so that line of credit data stored in the non-transitory memory of the lending institution computer and checking account data stored in a non-transitory memory of the one or more of the plurality of financial institution computers can be concurrently updated to thereby enable real time transactions.

6. Non-transitory computer memory as defined in claim 1, wherein repayment of the line of credit balance occurs from direct deposit funds prior to direct deposit funds being made available in the one or more of the plurality of checking accounts.

7. Non-transitory computer memory as defined in claim 1, wherein the an incremental line of credit qualifying module further includes the instruction of:
    associating the line of credit with a payroll processing entity.

8. Non-transitory computer memory as defined in claim 1, wherein the difference between the value of the purchase and the value associated with the one or more of the plurality of checking accounts being no greater than the value of one of the plurality of separate predetermined loan increments and being loaded to the one or more of the plurality of checking accounts without generating additional fees for at least a predetermined amount of time.

9. Non-transitory computer memory as defined in claim 2, wherein the incremental line of credit repayment module comprising the instruction of:
    deducting, by the lending institution computer, from the value associated with one or more of the plurality of the checking accounts a second portion of the line of credit balance responsive to the unpaid balance remaining outstanding for a predetermined amount of time.

10. Non-transitory computer memory encoded with computer program and operable on a computer to allow a debit card user to access a line of credit associated with one or more of a plurality of checking accounts when using a debit card, the computer program comprising the instructions of:
    establishing, by a computer associated with a financial institution thereby defining a financial institution computer, a line of credit associated with one or more of a plurality of the checking accounts responsive to consumer underwriting data and predetermined qualification parameters, the line of credit having a total credit limit and adapted to be drawn in at least one of a plurality of separate predetermined loan increments each being equal in value and less than the total credit limit,
    receiving, by the financial institution computer, data indicating a debit card associated with the one or more of the plurality of the checking accounts is being used as payment for a proposed purchase and a value of the proposed purchase is greater than a value associated with the one or more of the plurality of checking accounts,
    determining, by the financial institution computer responsive to receiving the data, a number of separate predetermined loan increments to be added to the value associated with the one or more of the plurality of checking accounts so that the number of separate predetermined loan increments multiplied by the value of one of the plurality of separate predetermined loan increments and plus the value associated with the one or more of the plurality of checking accounts exceeds the value of the proposed purchase by less than the value of one of the plurality of separate predetermined loan increments,
    loading, by the financial institution computer, the one or more of the plurality of checking accounts with one or more of the plurality of separate predetermined loan increments that corresponds with the number of separate predetermined loan increments to thereby define one or more loaded predetermined increments when the one or more of the loaded predetermined increments and a total value of a predetermined loan advance fee corresponding thereto collectively do not exceed a line of credit balance available, the total value of the predetermined loan advance fee being equal to the value of one of the plurality of separate predetermined loan increments multiplied by the number of separate predetermined loan increments, and
    determining, by the financial institution computer, a new value of the line of credit balance available, the new value being a previous value of the line of credit balance available minus the one or more loaded predetermined increments to the one or more of the plurality of checking accounts and minus the total value of the predetermined loan advance fee, the total value of the predetermined loan advance fee being less than the loaded predetermined increments loaded to the one or more of the plurality of checking accounts.

11. Non-transitory computer memory as defined in claim 10, the computer program comprising the instruction of:
    repaying at least a first portion of the new value of the line of credit balance responsive to an automatic deposits being available to the financial institution computer and prior to being made available to the debit card user, the difference between the new value of the line of credit balance minus the first portion of the new value of line of credit balance repaid thereby defining an unpaid balance.

12. Non-transitory computer memory as defined in claim 11, wherein the first portion of the new value of line of credit balance repaid includes at least the total value of the predetermined loan advance fee, wherein the value of the proposed purchase includes adjustments for one or more of the following: coupons, discounts, instant rebates, and sales tax, wherein the lending institution is a federally-chartered bank subject to federal banking laws and regulations and not subject to state banking laws and regulations, and wherein the line of credit is bank product so that the line of credit complies with federal Regulation Z.

13. Non-transitory computer memory as defined in claim 10, wherein the financial institution computer is a first financial institution computer, the line of credit is one of a plurality of line of credits associated with the first financial institution computer, and wherein the one or more of the plurality of checking accounts are associated with one or more of a plurality of second financial institutions and one or more of a plurality of second financial institution computers positioned remote from the first financial institution computer.

14. Non-transitory computer memory as defined in claim 13, wherein a core banking system of the first financial institution is integrated with a core banking system of one or more of the plurality of second financial institutions so that line of credit data stored in the non-transitory memory of the first financial institution computer and checking account data stored in a non-transitory memory of one or more of the plurality of second financial institution computers can be concurrently updated to thereby enable real time transactions.

15. Non-transitory computer memory as defined in claim 10, wherein repayment of the line of credit balance occurs from direct deposit funds prior to the direct deposit funds being made available in the one or more of the plurality of checking accounts.

16. Non-transitory computer memory as defined in claim 10, the computer program comprising the instruction of:
    associating the line of credit with a payroll processing entity.

17. Non-transitory computer memory as defined in claim 10, wherein the difference between the value of the purchase and the value associated with the one or more of the plurality of checking accounts being no greater than the value of one of the plurality of separate predetermined loan increments and being loaded to the one or more of the plurality of checking accounts without generating additional fees for at least a predetermined amount of time.

18. Non-transitory computer memory as defined in claim 11, the computer program comprising the instruction of:

deducting, by the financial institution computer, from the value associated with one or more of the plurality of the checking accounts a second portion of the line of credit balance responsive to the unpaid balance remaining outstanding for a predetermined amount of time.

19. A computer associated with a financial institution defining a financial institution computer to provide access to a line of credit when using a debit card, the financial institution computer comprising:

a processor for processing line of credit data; and non-transitory computer memory encoded with computer program and operable on the financial institution computer to allow a debit card user to access a line of credit associated with one or more of a plurality of checking accounts when using the debit card, the computer program comprising the instructions of:

establishing, by the financial institution computer, a line of credit associated with one or more of a plurality of the checking accounts responsive to consumer underwriting data and predetermined qualification parameters, the line of credit having a total credit limit and adapted to be drawn in at least one of a plurality of separate predetermined loan increments each being equal in value and less than the total credit limit, determining, by the financial institution computer responsive to receipt of transaction data, when the debit card associated with the one or more of the plurality of the checking accounts is being used as payment for a proposed purchase and when a value of the proposed purchase is greater than a value associated with the one or more of the plurality of checking accounts, determining, by the financial institution computer responsive to the value associated with the one or more of the plurality of checking accounts being greater than the value of the proposed purchase, a number of separate predetermined loan increments to be added to the value associated with the one or more of the plurality of checking accounts so that the number of separate predetermined loan increments multiplied by the value of one of the plurality of separate predetermined loan increments and plus the value associated with the one or more of the plurality of checking accounts exceeds the value of the proposed purchase by less than the value of one of the plurality of separate predetermined loan increments, and loading, by the financial institution computer, the one or more of the plurality of checking accounts with one or more of the plurality of separate predetermined loan increments that corresponds with the number of separate predetermined loan increments to thereby define one or more loaded predetermined increments when the one or more of the loaded predetermined increments and a total value of a predetermined loan advance fee corresponding thereto collectively do not exceed a line of credit balance available, the total value of the predetermined loan advance fee being equal to the value of one of the plurality of separate predetermined loan increments multiplied by the number of separate predetermined loan increments.

20. A financial institution computer as defined in claim 19, wherein the financial institution computer being a first financial institution computer and the line of credit is associated with the first financial institution computer, and wherein the one or more of the plurality of checking accounts are associated with one or more of a plurality of second financial institutions and one or more of a plurality of second financial institution computers positioned remote from the first financial institution computer, the computer program comprising the instructions of:

determining, by the first financial institution computer, a new value of the line of credit balance available, the new value being a previous value of the line of credit balance available minus the one or more loaded predetermined increments to the one or more of the plurality of checking accounts and minus the total value of the predetermined loan advance fee, the total value of the predetermined loan advance fee being less than the one or more loaded predetermined increments loaded to the one or more of the plurality of checking accounts, and repaying at least a first portion of the new value of the line of credit balance responsive to an automatic deposits being available to the first financial institution computer and prior to being made available to the debit card user, the difference between the new value of the line of credit balance minus the first portion of the new value of line of credit balance repaid thereby defining an unpaid balance.

* * * * *